(12) United States Patent
Tanaka et al.

(10) Patent No.: US 10,749,386 B2
(45) Date of Patent: Aug. 18, 2020

(54) STATOR CORE WITH TOP-CONNECTED TOOTH PARTS

(71) Applicant: DENSO CORPORATION, Kariya, Aichi-pref. (JP)

(72) Inventors: Asuka Tanaka, Kariya (JP); Katsuya Fujisaki, Kariya (JP)

(73) Assignee: DENSO CORPORATION, Kariya, Aichi-Pref. (JP)

( * ) Notice: Subject to any disclaimer, the term of this patent is extended or adjusted under 35 U.S.C. 154(b) by 10 days.

(21) Appl. No.: 16/113,368

(22) Filed: Aug. 27, 2018

(65) Prior Publication Data
US 2019/0074734 A1 Mar. 7, 2019

(30) Foreign Application Priority Data

Sep. 5, 2017 (JP) .................................. 2017-170118

(51) Int. Cl.
H02K 1/14 (2006.01)
H02K 1/16 (2006.01)
H02K 1/27 (2006.01)
H02K 5/22 (2006.01)
H02K 11/33 (2016.01)
(Continued)

(52) U.S. Cl.
CPC ........... *H02K 1/146* (2013.01); *B62D 5/0403* (2013.01); *H02K 1/16* (2013.01); *H02K 1/276* (2013.01); *H02K 5/225* (2013.01); *H02K 11/33* (2016.01); *B62D 5/0412* (2013.01); *B62D 5/0463* (2013.01); *H02K 29/03* (2013.01); *H02K 2213/03* (2013.01)

(58) Field of Classification Search
CPC .......... H02K 1/146; H02K 1/16; H02K 5/225; H02K 11/33; H02K 1/276; H02K 2213/03; H02K 29/03; H02K 1/165; B62D 5/0403; B62D 5/0412; B62D 5/0463
USPC ........................................... 310/211, 216.069
See application file for complete search history.

(56) References Cited

U.S. PATENT DOCUMENTS

2007/0063610 A1* 3/2007 Miyashita .............. H02K 1/148
310/216.057
2012/0098376 A1* 4/2012 Ombach ................ H02K 21/14
310/156.01
(Continued)

FOREIGN PATENT DOCUMENTS

JP 2013-081303 A 5/2013

Primary Examiner — John K Kim
(74) Attorney, Agent, or Firm — Maschoff Brennan

(57) ABSTRACT

A stator core is a stack body of plural plates. Each plate includes an annular back yoke part, plural top-connected tooth parts, plural top-separated tooth parts, plural magnetic path parts and plural top open parts. The top-connected tooth part and the top-separated tooth part protrude from the back yoke part in a radial direction. The top magnetic path part connects top ends of two top-connected tooth parts. The top open part is open to a rotor side at both sides of the top end of the top-separated tooth part. The stator core includes a back yoke, plural teeth, plural partially-connected parts and plural open parts. Each partially-connected part is formed of plural top magnetic path parts and top open parts, which extend in an axial direction. Each open part is formed of only the plural top open parts, which extend continuously in the axial direction.

14 Claims, 26 Drawing Sheets

(51) Int. Cl.
*H02K 29/03* (2006.01)
*B62D 5/04* (2006.01)

(56) References Cited

U.S. PATENT DOCUMENTS

| | | | |
|---|---|---|---|
| 2012/0139372 A1* | 6/2012 | Nakano | H02K 1/148 310/83 |
| 2014/0246944 A1* | 9/2014 | Koka | H02K 3/28 310/211 |
| 2015/0229166 A1* | 8/2015 | Miyashita | H02K 1/148 310/216.016 |
| 2016/0172918 A1* | 6/2016 | Hirotani | H02K 3/28 310/198 |
| 2019/0074734 A1* | 3/2019 | Tanaka | B62D 5/0403 |

* cited by examiner

US 10,749,386 B2

STATOR CORE WITH TOP-CONNECTED TOOTH PARTS

CROSS REFERENCE TO RELATED APPLICATION

This application is based on Japanese patent application No. 2017-170118 filed on Sep. 5, 2017, the whole contents of which are incorporated herein by reference.

FIELD

The present disclosure relates to a stator core of a stator of a rotary electric machine.

BACKGROUND

It is known in a rotary electric machine to connect top ends of teeth of a stator core thereby to reduce cogging torque. In case that the top ends of all the teeth are connected, leakage flux in the stator increases and lowers torque. Patent document, JP 2013-81303A (US 2014-0246944A1), proposes to connect top ends of teeth only partially.

In case that the top ends of the teeth are connected, there remain no parts, which hold teeth not to deform at the time of forming a winding in a stator core. As a result the teeth are likely to deform.

SUMMARY

It is therefore an object to provide a stator core of a rotary electric machine, which reduces cogging torque and protect teeth from deforming.

According to one aspect, a stator core for a rotary electric machine having a rotor comprises plural plates, each of which includes a back yoke part formed in an annular shape, plural top-connected tooth parts protruding from the back yoke part in a radial direction toward the rotor of the rotary electric machine, plural top-separated tooth parts protruding from the back yoke part in the radial direction toward the rotor, plural top magnetic path parts connecting top ends of two of the top-connected tooth parts, and plural top open parts opening toward the rotor at both sides of the top ends of the top-separated tooth parts. The plural plates are stacked in the axial direction to form the stator core, which comprises a back yoke, plural teeth, plural partially-connected parts, and plural open parts. The back yoke is formed of the plural back yoke parts and extending continuously in the axial direction. The plural teeth are formed of the plural top-connected tooth parts and the plural top-separated tooth parts and extend continuously in the axial direction. The plural partially-connected parts are formed of the plural top magnetic path parts and the plural top open parts and extend continuously in the axial direction. The plural open parts are formed of only the plural top open parts and extend continuously in the axial direction while opening toward the rotor.

DETAILED DESCRIPTION OF THE EMBODIMENT

Figure 1:
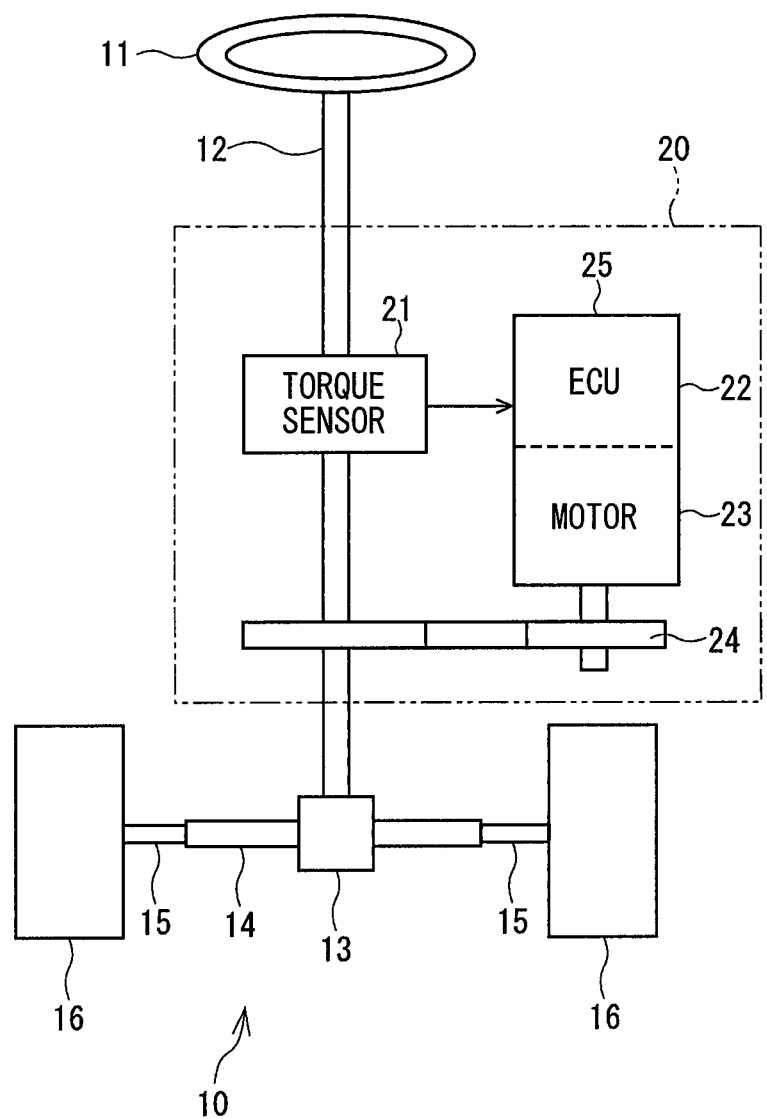
FIG. 1 is a general structural diagram of an electric power steering device, in which a motor having a stator core according to a first embodiment is used.

Embodiments of a stator core of a rotary electric machine will be described below with reference to the accompanying drawings. Substantially same structural parts among the embodiments will be designated with same reference numerals for brevity.

First Embodiment

Referring first to FIG. 1, a motor, which is a rotary electric machine having a stator core according to a first embodiment, is used in an electric power steering device 20 of a vehicle.

<Electric Power Steering System>

The electric power steering device 20 will be described first. As shown in FIG. 1, the electric power steering device 20 is provided in a steering system 10. In the steering system 10, a rotary movement of a steering wheel 11 by a driver of a vehicle is transmitted to a rack and pinion mechanism 13 via a steering shaft 12 and changed to a linear movement of a rack shaft 14 to change a direction of tire wheels 16 through tie rods 15. The electric power steering device 20 outputs an assist torque to the steering shaft 12 to assist a steering operation of the driver.

The electric power steering device 20 includes a torque sensor 21, an electronic control unit (ECU) 22, a motor 23 and a transmission mechanism 24. The torque sensor 21 is attached to the steering shaft 12 to detect a steering torque. The ECU 22 determines a target torque of the motor 23 based on detection values of various sensors including the torque sensor 21 and controls the motor 23. The motor 23 and the ECU 22 are integrated in one unit to form an electro-mechanical type driving unit 25. The transmission mechanism 24 transmits assist torque outputted from the motor 23 to the steering shaft 12. The electric power steering device 20 is a column-assist type but may be other types such as a rack-assist type.

<Driving Unit>

Figure 2:
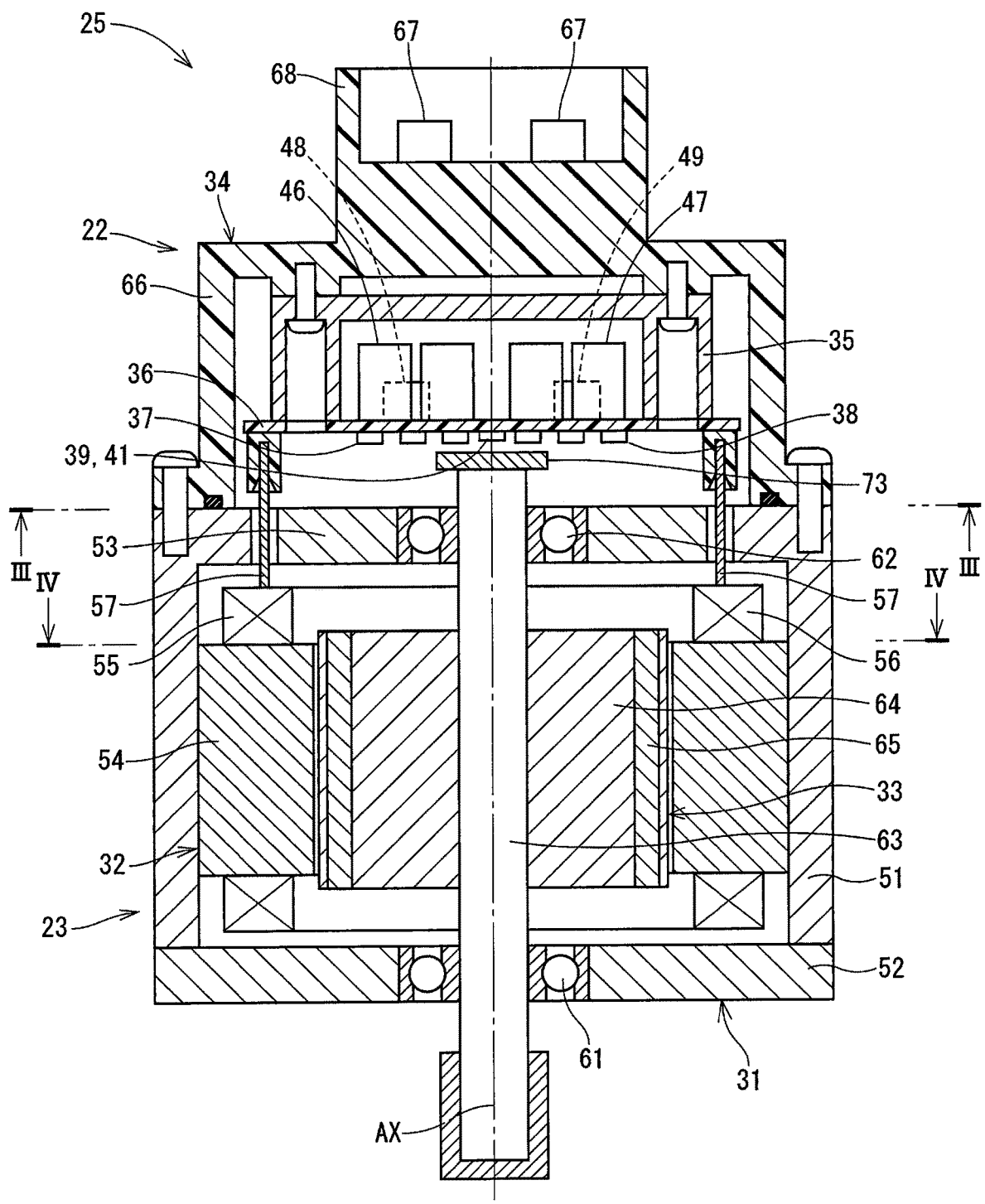
FIG. 2 is a sectional view of a driving unit including the motor shown in FIG. 1.
Figure 3:
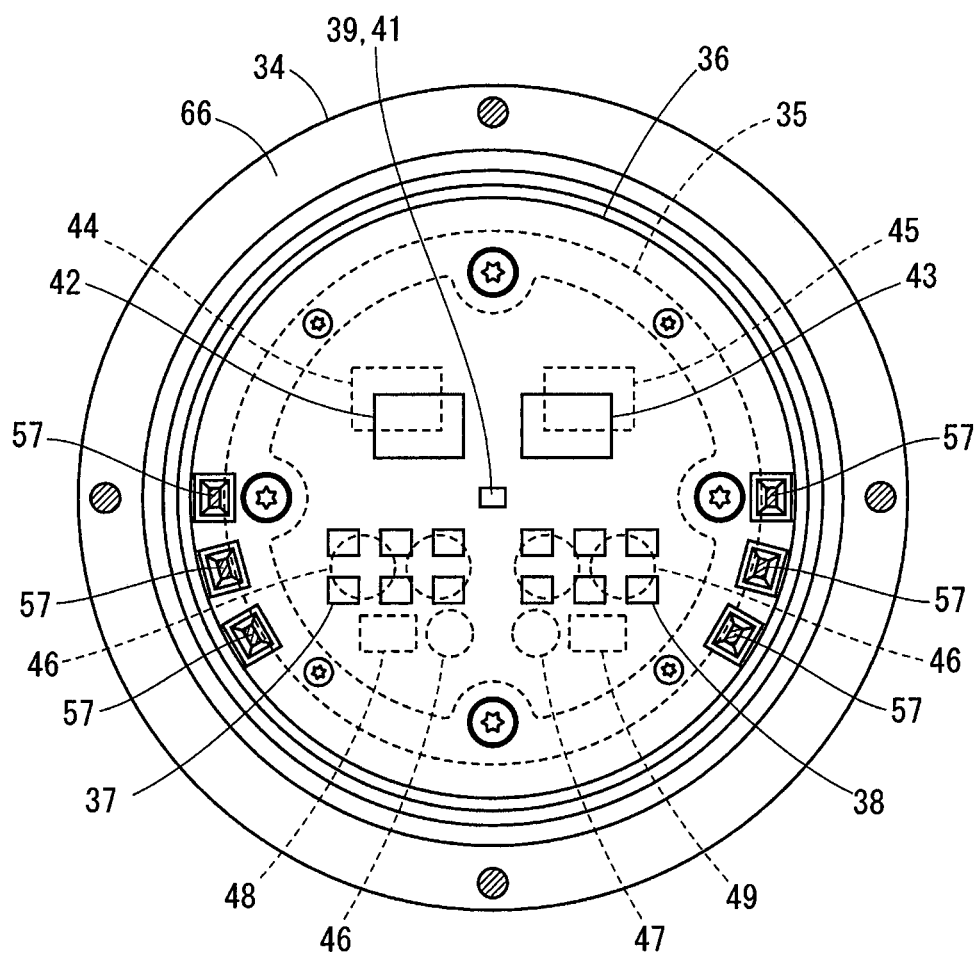
FIG. 3 is a sectional view of the driving unit taken along a line III-III indicated in FIG. 1.
Figure 4:
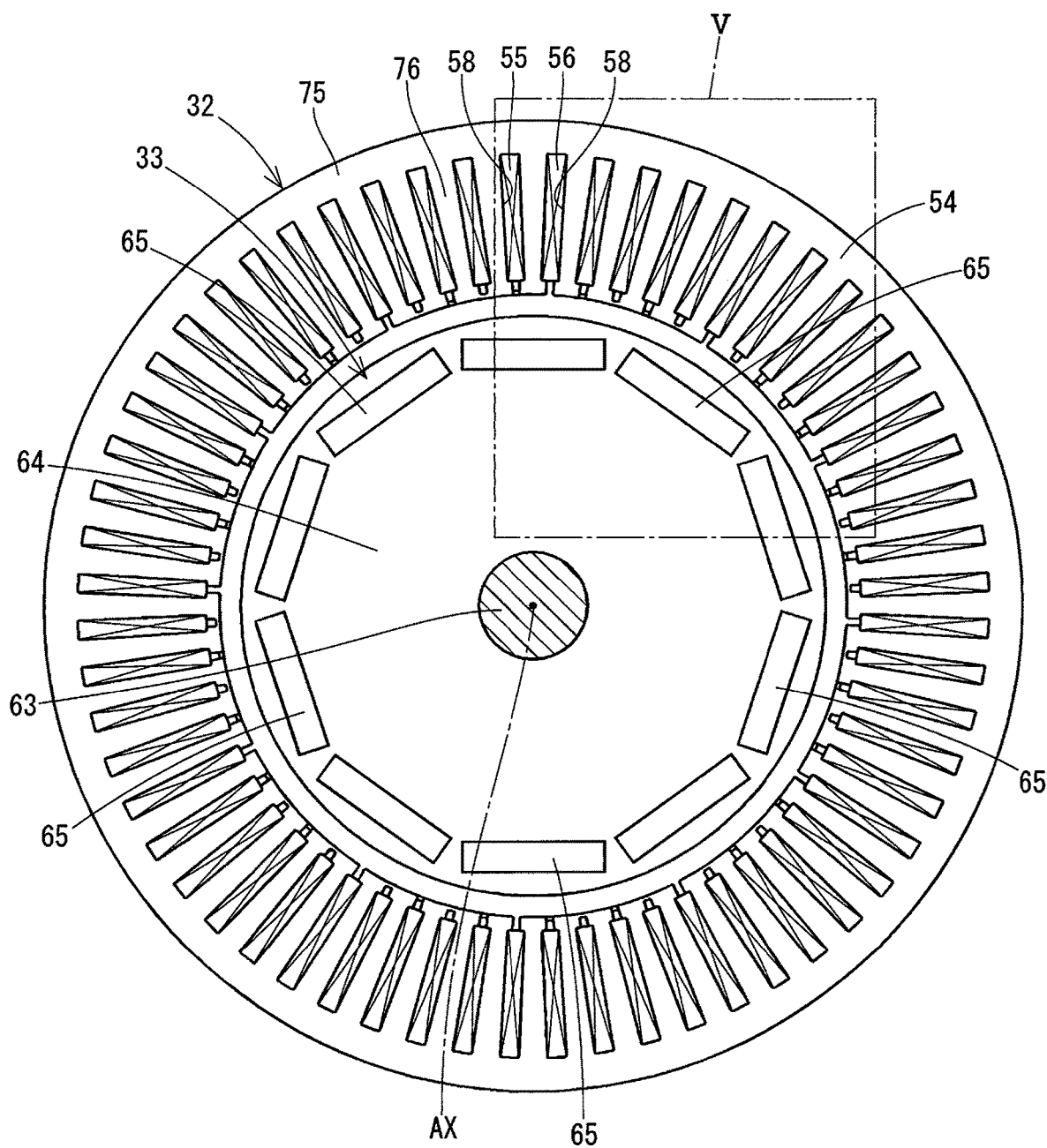
FIG. 4 is a sectional view of a stator and a rotor of the motor shown in FIG. 1.

The driving unit 25, which includes the ECU 22 and the motor 23 will be described next. As shown in FIG. 2 to FIG. 4, the driving unit 25 includes a housing 31, a stator 32 and a rotor 33, which are coaxial about a center of axis AX and form the motor 23. The driving unit 25 further includes a cover 34, a heat sink 35, an electronic circuit substrate 36 and various electronic components 37 to 49, which form the ECU 22.

The housing 31 has a cylindrical case 51, a front end frame 52 located at one axial end of the cylindrical case 51 and a rear end frame 53 located at the other axial end of the cylindrical case 51. The stator 32 has a stator core 54 fixed to the housing 31 and two three-phase winding sets 55, 56. Each phase winding of the three-phase winding sets 55 and 56 is connected to the electronic circuit substrate 36 via lead wires.

Figure 5:
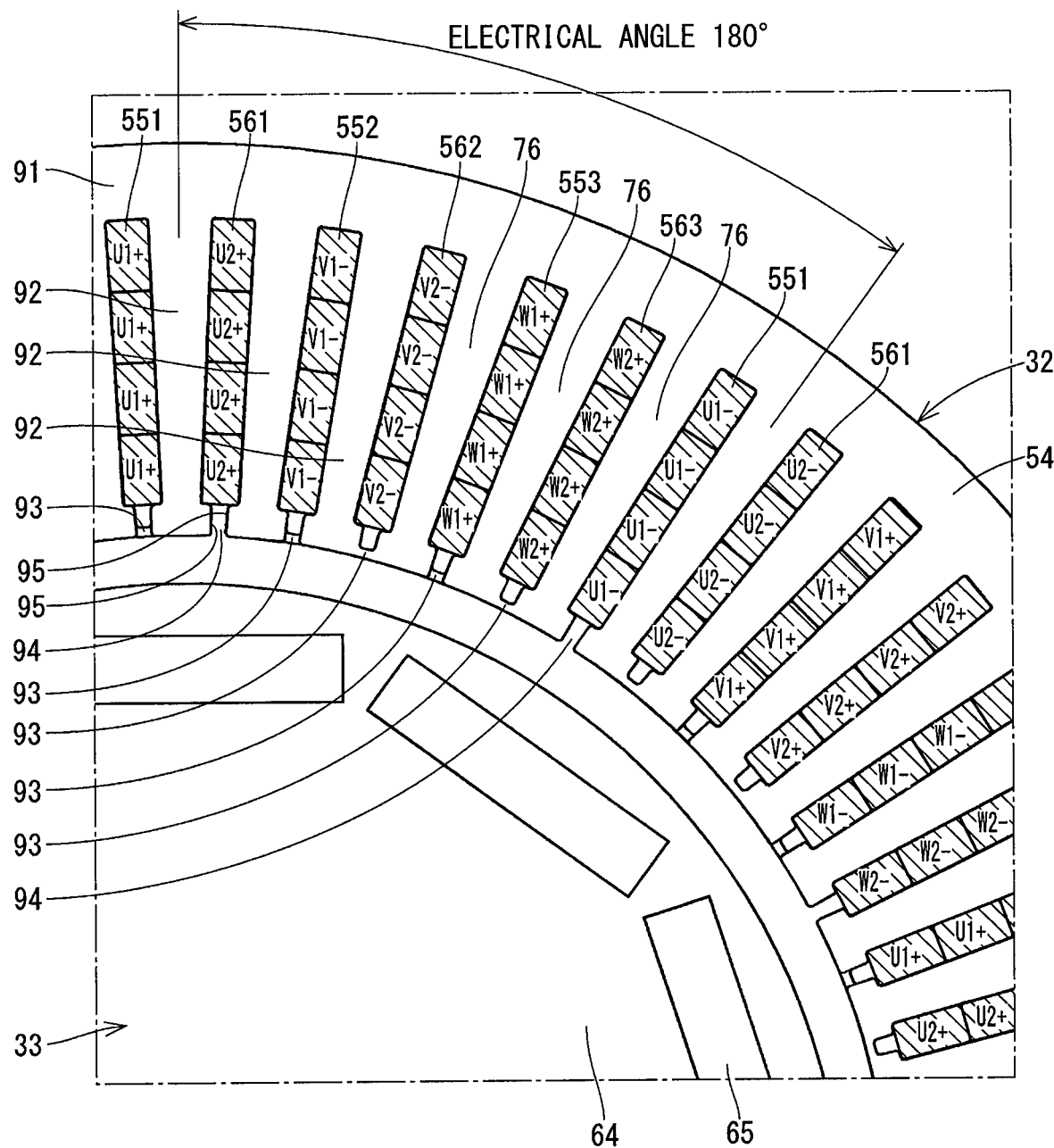
FIG. 5 is an enlarged view of a part V indicated in FIG. 4.
Figure 6:
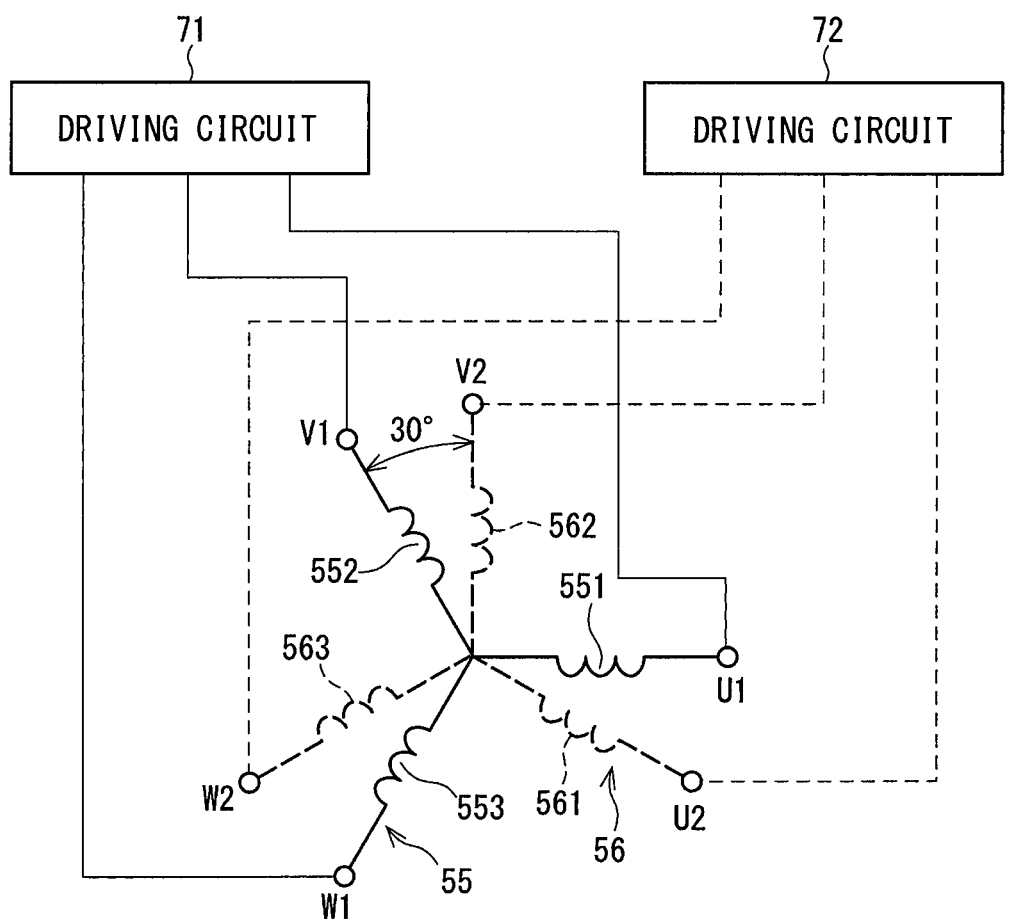
FIG. 6 is an electric wiring diagram of an arrangement of a three-phase winding set of the motor shown in FIG. 2.

As shown in FIG. 4 to FIG. 6, the three-phase winding sets 55 and 56 have the same electric characteristics and are wound about the stator core 54, which is common to both three-phase winding sets 55 and 56. The three-phase winding set 55 is formed of a U-phase winding 551, a V-phase winding 552 and a W-phase winding 553. The three-phase winding set 56 is formed of a U-phase winding 561, a V-phase winding 562 and a W-phase winding 563. Each winding is formed of segment conductors inserted into slots in the axial direction and connected at axial end side of the stator core 54. Each slot 58 of the stator core 54 is formed at equi-angular interval, which corresponds to a pitch of electrical angle $\theta 1$. Each phase winding of the three-phase winding set 55 and each phase winding of the three-phase winding set 56 are arranged with an angular difference of the electrical angle $\theta 1$. For this reason, three-phase a.c. currents, which have the same amplitude and the phase difference $\theta 1$, are supplied to the three-phase winding sets 55 and 56. In the first embodiment, $\theta 1$ is 30° in electrical angle.

As shown in FIG. 2 to FIG. 4, the rotor 33 has a motor shaft 63 rotatably supported by the housing 31 via bearings 61, 62, a rotor core 64 press-fitted to the motor shaft 63 and plural magnets 65 provided on an outer periphery of the rotor core 64. In the first embodiment, the rotor 33 is an embedded magnet type but may be a surface magnet type.

The cover 34 has a cup-shaped cover body part 66, which is fixed to the rear end frame 53, and a connector part 68, which includes therein terminals 67 for connecting the ECU 22 to an external device. The heat sink 35 is fixed to an inside of the cover body part 66. The electronic circuit substrate 36 is fixed to the heat sink 35, particularly at a location, which faces the rear end frame 53. On the electronic circuit substrate 36, plural switching components 37, 38, rotation angle sensors 39, 41, customized ICs 42, 43, microcomputers 44, 45, capacitors 46, 47, inductors 48, 49 and the like are mounted.

The switching components 37 and 38 form driving circuits 71 and 72 (refer to FIG. 6), which correspond to the three-phase winding sets 55 and 56, respectively. The rotation angle sensors 39 and 41 are located to face a permanent magnet 73 provided at a top end of the motor shaft 63. The customized ICs 42 and 43 output driving signals to the switching components 37 and 38, respectively. The microcomputers 44 and 45 calculate, based on the rotation angle of the rotor 33 and the like, command values of power to be supplied to the three-phase winding sets 55 and 56. The capacitors 46 and 47 smooth power supplied from a power supply and prevents noises, which arise from switching operations of the switching components 37 and 38, from flowing out. The inductors 48 and 49 form filter circuits with the capacitors 46 and 47.

The driving unit 25 configured as described above supplies currents to the three-phase winding sets 55 and 56 based on detection values of the rotation sensors 39 and 41 and the like so that rotating magnetic fields are generated to rotate the rotor 33. The driving unit 25 is an electro-mechanical integrated type, in which the ECU 22 and the motor 23 are integrated into one unit, but may be a discrete type, in which the ECU 22 and the motor 23 are separated and connected via a harness.

<Stator Core>

Figure 7:
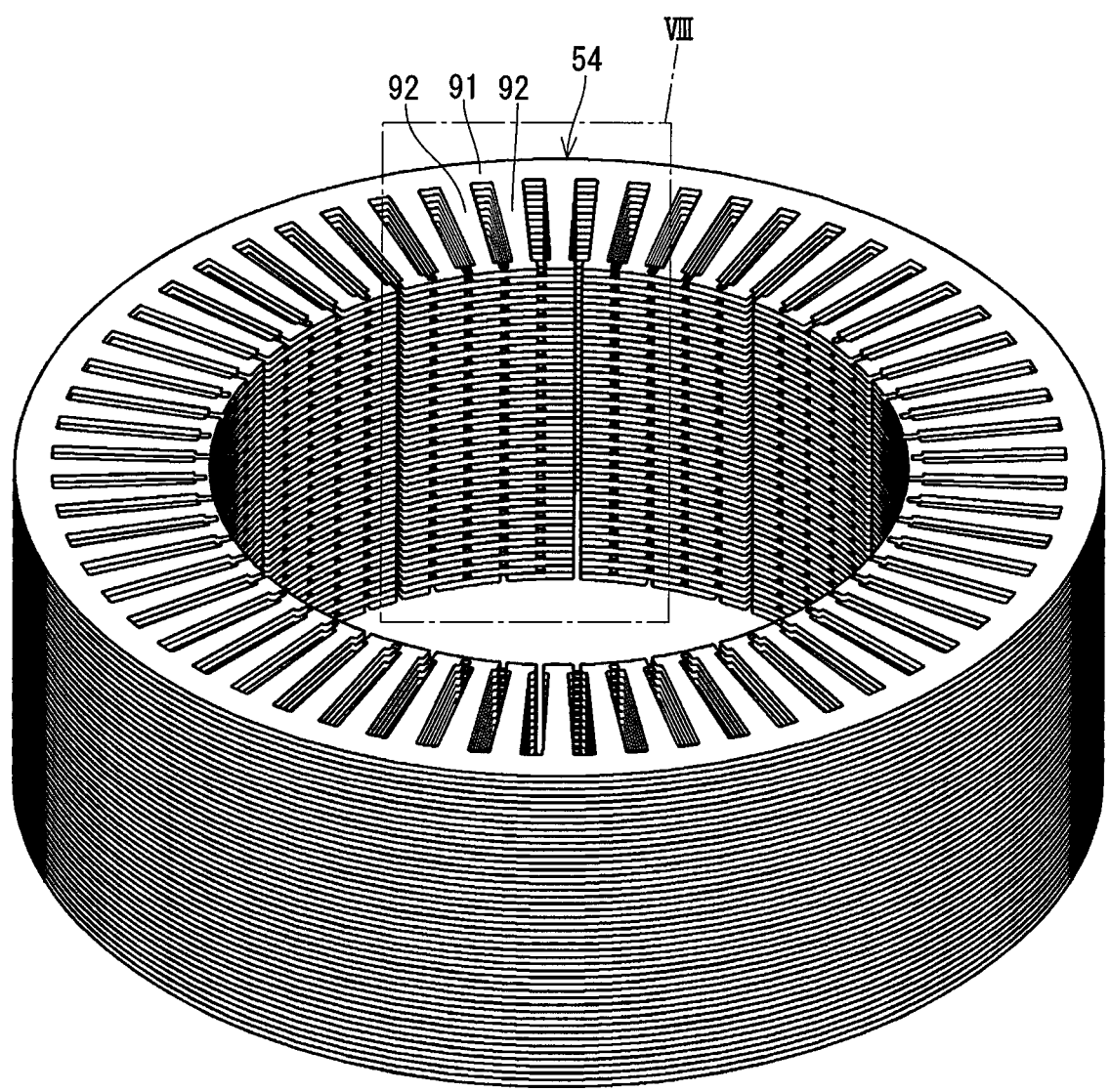
FIG. 7 is a perspective view of the stator core of the motor shown in FIG. 2.
Figure 8:
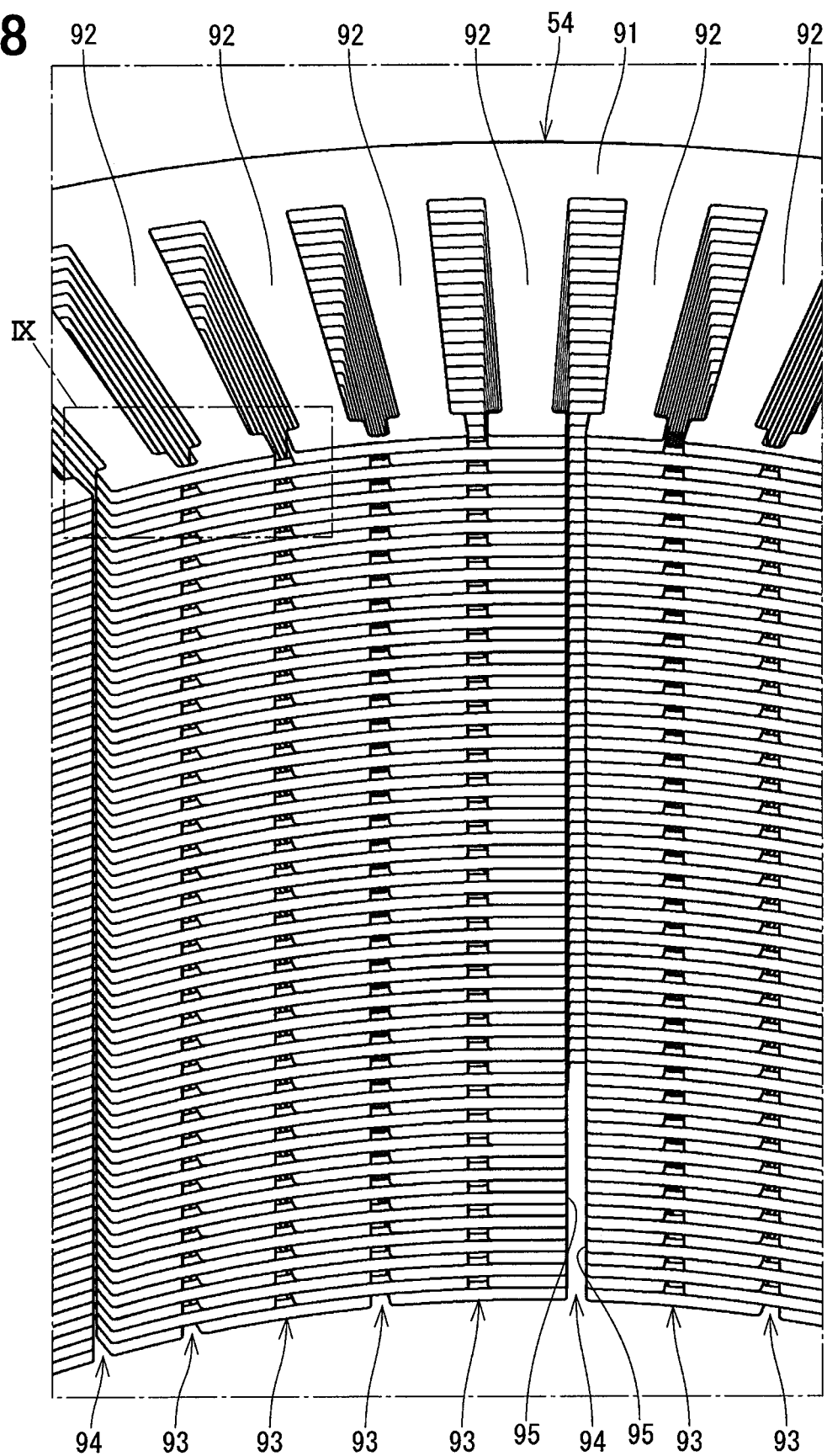
FIG. 8 is an enlarged view of a part VIII indicated in FIG. 7.
Figure 9:
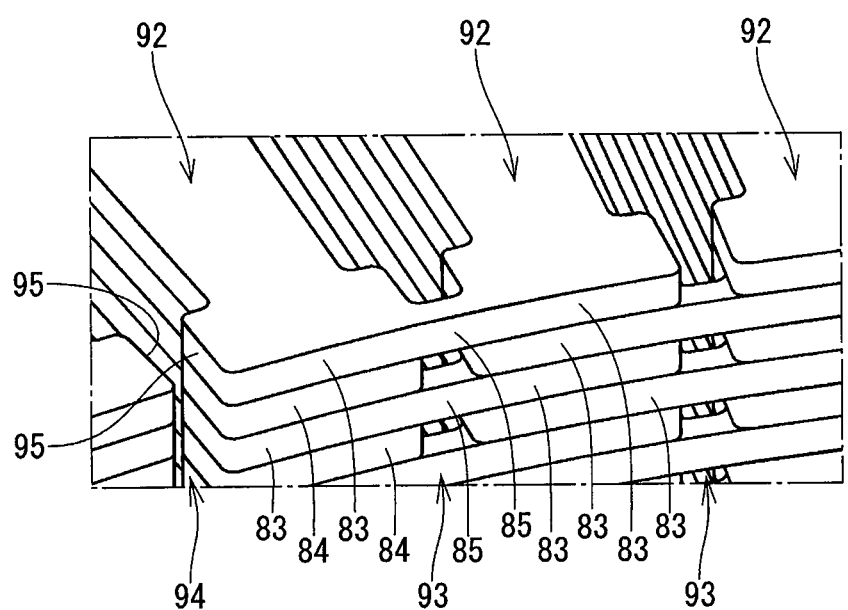
FIG. 9 is an enlarged view of a part IX indicated in FIG. 8.

The stator core 54 will be described in more detail below. In FIG. 2, the stator core 54 is shown as a single unit for simplicity of illustration. In practice, the stator core 54 is a stack body, in which plural plates 81 such as electromagnetic steel plates are stacked as shown in FIG. 7, FIG. 8 and FIG. 9.

Figure 10:
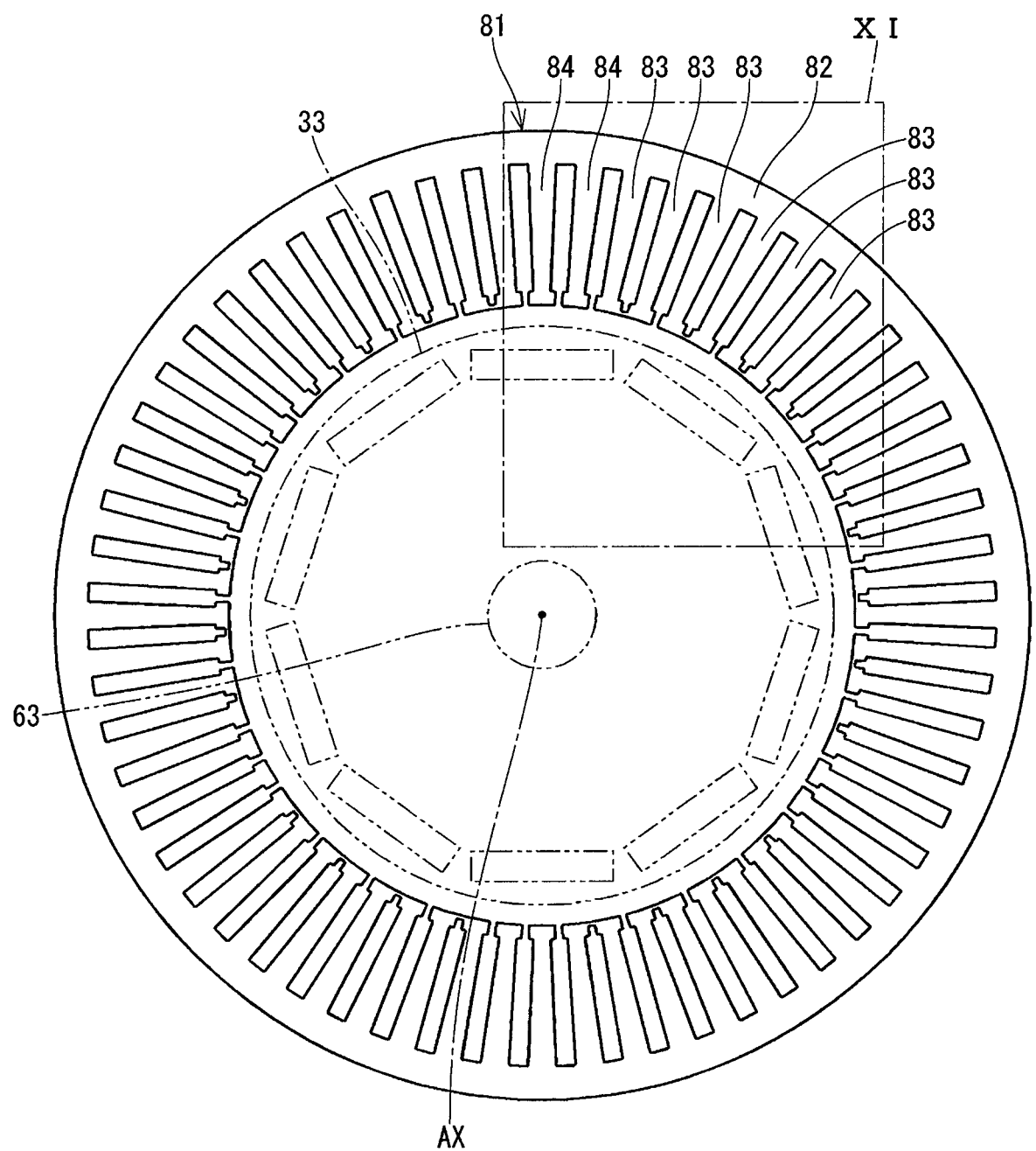
FIG. 10 is a front view of a plate forming the stator core shown in FIG. 2.
Figure 11:
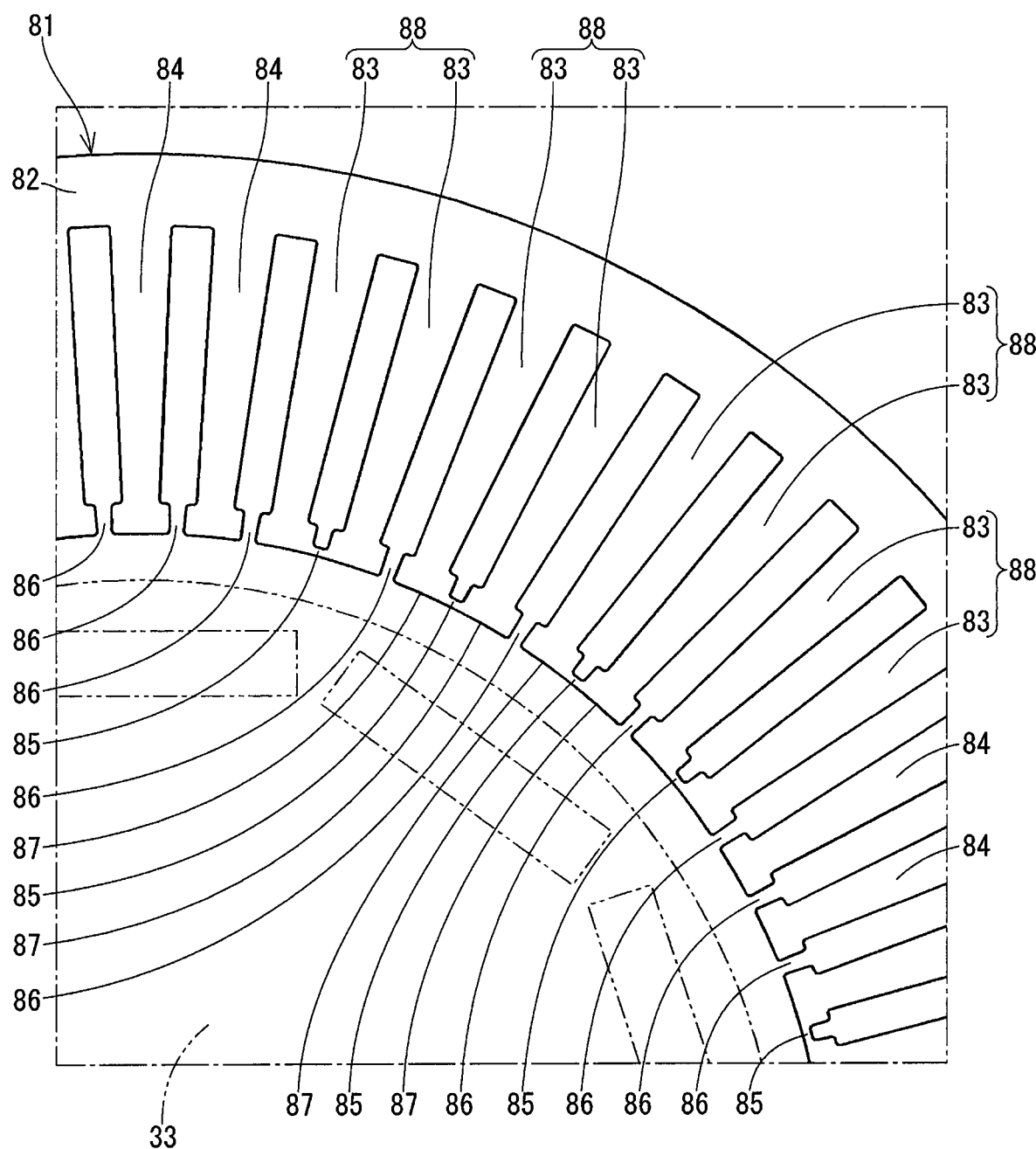
FIG. 11 is an enlarged view of a part XI indicated in FIG. 10.

As shown in FIG. 10 and FIG. 11, the plate 81 has a back yoke part 82, plural top-connected tooth parts 83, plural top-separated tooth parts 84, plural top magnetic path parts 85 and plural top open parts 86. The back yoke part 82 is formed in an annular shape. Each top-connected tooth part 83 has a top end part, which is connected to a top end part of the adjacent top-connected tooth part. Each top-separated tooth part 84 has a top end part, which is separated from and independent of a top end part of the adjacent tooth part. Both of the top-connected tooth parts 83 and the top-separated tooth parts 84 protrude in a radially inward direction from the back yoke part 82. The top magnetic path part 85 connects top ends of adjacent two of the top-connected tooth parts 83. The top open part 86 is open toward the rotor 33 at both sides of a top end of the top-separated tooth part 84.

The top end of the top-connected tooth part 83 and the top end of the top-separated tooth part 84 are one ends or surfaces, which are on the rotor 33 side, that is, radially inner sides of each tooth part. The top end is not a top end part but a single point in the radial direction. The top end part is a part, which includes the top end. The top magnetic path part 85 continuously connects top end surfaces 87 of one and the other of the top-connected tooth parts 83, that is, two top end surfaces 87 of the top-connected tooth parts 83, which are adjacent to each other in a circumferential direction. Thus, a gap between the top magnetic path part 85 and the rotor 33 is generally the same as that between the top-connected tooth part 83 and the rotor 33.

The top open part 86 is formed of a slit, which is fully open in the radial direction from the rotor 33 side to the slot 58. The top-connected tooth part is a tooth part, the top end of which is continuously connected to the top end of the other tooth part. The top-separated tooth part is a tooth part, the top end of which is not connected to the top end of the other tooth part and is separated, that is, separated from the other tooth part.

Figure 12:
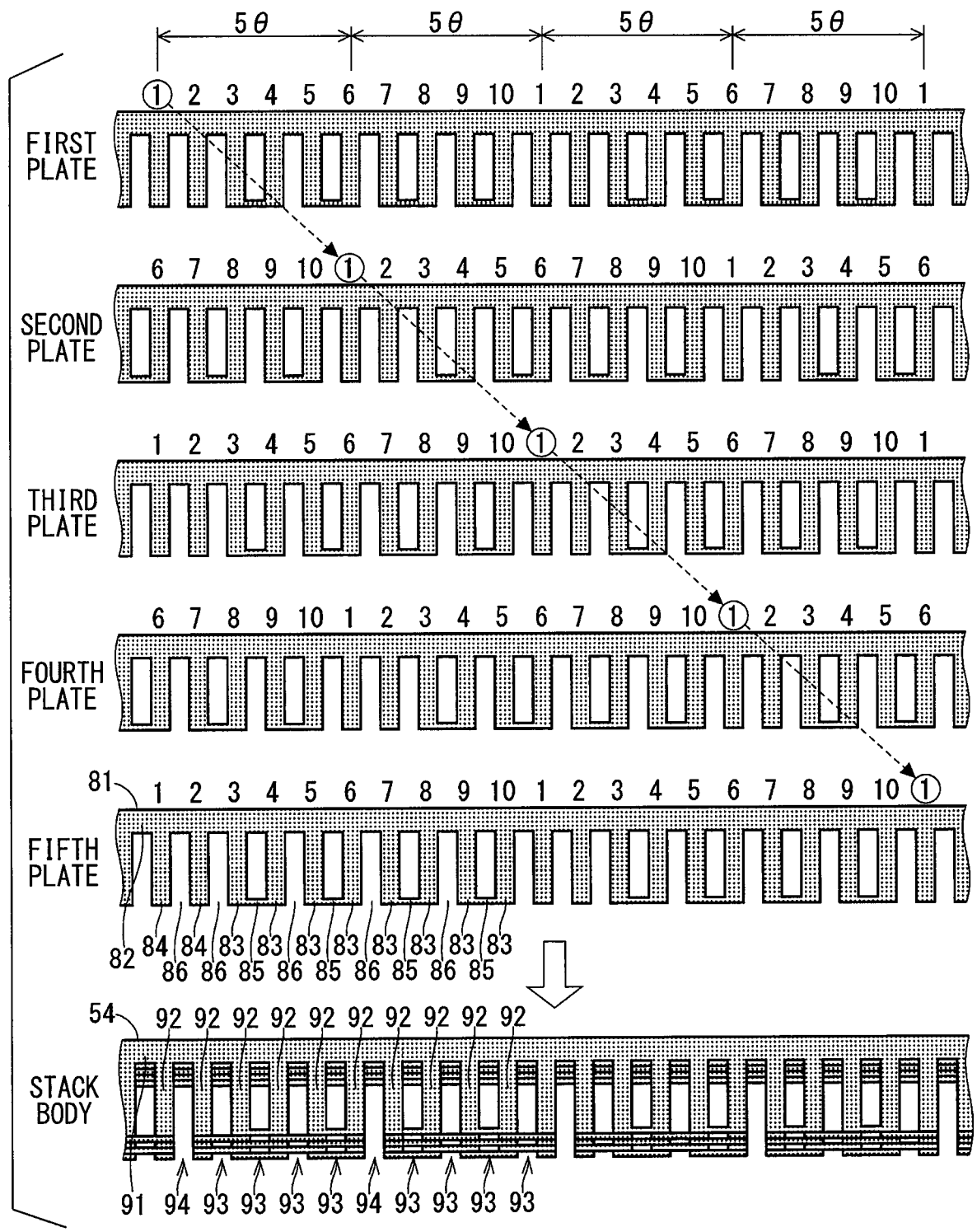
FIG. 12 is a schematic view of a stack of the stator core shown in FIG. 7 and showing a development a plate of each layer and the stator core formed of a stack of such plates.

As shown in FIG. 11, two top-connected tooth parts 83 adjacent to each other in the circumferential direction and connected by the top magnetic path part 85 is referred to as a two-connected tooth part 88. The plate 81 is formed in a shape that two top-separated tooth parts 84 and four two-connected tooth parts 88 are arranged sequentially in the circumferential direction. A number of plates 81, which are in the same shape, are stacked with a fixed rotational buildup angle 5θ in a rotational direction, that is, circumferential direction, between adjacent two plates 81 stacked in the axial direction of the motor 23. That is, each plate 81 is stacked in the axial direction by shifting a fixed angular interval 5θ in the circumferential direction relative to the adjacent plate 81 as shown in FIG. 12, in which five plates (first plate to fifth plate) are exemplarily illustrated. That is, the stator core 54 is a rotationally stacked body having the fixed rotational buildup angle 5θ. θ is an angular pitch between two tooth parts, which are adjacent in the circumferential direction. This angular pitch θ is an angular pitch of each of tooth parts 92, which will be described later.

As shown in FIG. 5, FIG. 8, FIG. 9 and FIG. 12, the stator core 54 includes a back yoke 91, plural teeth 92, plural partially-connected parts 93 and plural open parts 94. Assuming that a direction of an axis parallel to the center of axis AX (refer to FIG. 4) of the rotor 33, the stator 54 and the motor 23, the back yoke 91 is formed of plural back yoke parts 82, which extend continuously in the axial direction. Each of the teeth 92, that is, tooth 92, is formed of plural top-connected tooth parts 83 and plural top-separated tooth parts 84, which extend continuously in the axial direction. Each of the partially-connected parts 93, that is, the partially-connected part 93, is formed of plural top magnetic path parts 85 and plural top open parts 86, which extend continuously in the axial direction. Each of the open parts 94, that is, the open part 94, is formed of only plural top open parts 86, which extend continuously in the axial direction.

The open part 94 is open toward the rotor 33 side and extends continuously in the axial direction. As a result, side surfaces 95 of the top ends of the tooth 92, which sandwich the open part 94, are exposed to an inner space of the stator core 54 and extend continuously in the axial direction. The open part 94 is used to support the teeth 92 at the time of forming the winding in the stator core 54.

In the first embodiment, as understood from FIG. 8 and FIG. 12, for example, some of the slots 58, which are located at a radially outside part of the open part 94, are open slots, which are fully open to the rotor 33 side (that is, radially inner side) through the open parts 94. The other of the slots 58, which are not the open slots, are closed slots, which are partially closed by the partially-connected parts 93 relative to the rotor 33 side.

The open parts 94 are arranged equi-angularly in the circumferential direction. Between the top ends of the teeth 92 located between two open parts 94 in the circumferential direction, only the partially-connected part 93 is arranged. That is, a completely connected part 97, which will be described later with reference to a sixth embodiment (FIG. 17), is not arranged. In the first embodiment, four partially-connected parts 93 are arranged between two open parts 94. The partially-connected part 93 is formed of the top magnetic path part 85 and the top open part 86, which are alternately arranged in the axial direction.

<Advantage>

(A) According to the first embodiment described above, the stator core 54 includes the back yoke 91, plural teeth 92, plural partially-connected parts 93 and plural open parts 94. The partially-connected part 93 is formed of plural top magnetic path parts 85, which continue in the axial direction, and plural top open parts 86. The open part 94 is formed of only plural top open parts 86, which extend continuously in the axial direction, and open toward the rotor 33 side over a whole length of the stator core 54 in the axial direction.

By thus connecting the top ends of the teeth 92 by the partially-connected parts 93, which are formed of the top magnetic path parts 85 and the top open parts 86, magnetic flux flowing from the teeth 92 toward the rotor 33 side flows partly to the adjacent teeth 92 through the partially-connected parts 93. As a result, the difference in the magnetic density in the circumferential direction in the gap between the teeth 92 and the rotor 33 is reduced and hence the cogging torque is reduced. Further, by providing the open part 94 formed of only the top open part 86, the side surfaces 95 of the top ends of the teeth 92, which are located at both sides sandwiching the open part 94, are exposed toward the inner space of the stator core 54 in the axial direction. As a result, by inserting a support member into the open part 94 from the inner side to support the teeth 92 at the time of forming the winding about the stator core 54, deformation of the teeth 92 is suppressed.

(B) Further, according to the first embodiment, the open parts 94 are arranged in the circumferential direction equi-angularly, that is, at the equal angular interval. Only the partially-connected part 93 is arranged between the top ends of the teeth 92 located between two open parts 94 in the circumferential direction. By thus arranging only the partially-connected part 93 between two adjacent open parts 94, the magnetic flux leaks uniformly in the circumferential direction at the top end of the teeth 92 and hence the cogging torque is reduced effectively.

(C) Further, according to the first embodiment, the partially-connected part 93 is formed of the alternate arrangement of the top magnetic path part 85 and the top open part 86 in the axial direction. Thus, the open part (that is, top open parts 86) and a closed part (that is, top magnetic path parts 85) are balanced well in the axial direction. As a result, flux leakage at the top end of the teeth 92 is equalized and the cogging torque is reduced effectively.

(D) Still further, according to the first embodiment, the plate 81 is formed such that the set of two top-separated tooth parts 84 and the set of four two-connected tooth parts 83 are arranged alternately in the circumferential direction. The stator core 54 is the stack body, the rotational buildup angle of which is fixed to 5θ. By rotationally stacking the plates 81, the open part 94 fully opening toward the rotor 33 side is provided in the axial direction and the top ends of the teeth 92 are connected by the partially-connected parts 93 between the open parts 94. Since the stator core 54 is the stack body of the plates 81, a variation of magnetic characteristic caused by a rolled material forming the plate 81 and a variation of stack thickness are minimized and generation of torque ripple is reduced.

(E) In addition, since the rotational buildup angle is fixed, the stator core 54 is manufactured simply.

(F) Still further, according to the first embodiment, the top open part 86 is formed of a slit, which is fully open in the radial direction from the rotor 33 side to the slot 58. For this reason, it is possible to provide the location of supporting the teeth 92 as large as possible at the time of forming the winding about the stator core 54.

Second Embodiment

Figure 13:
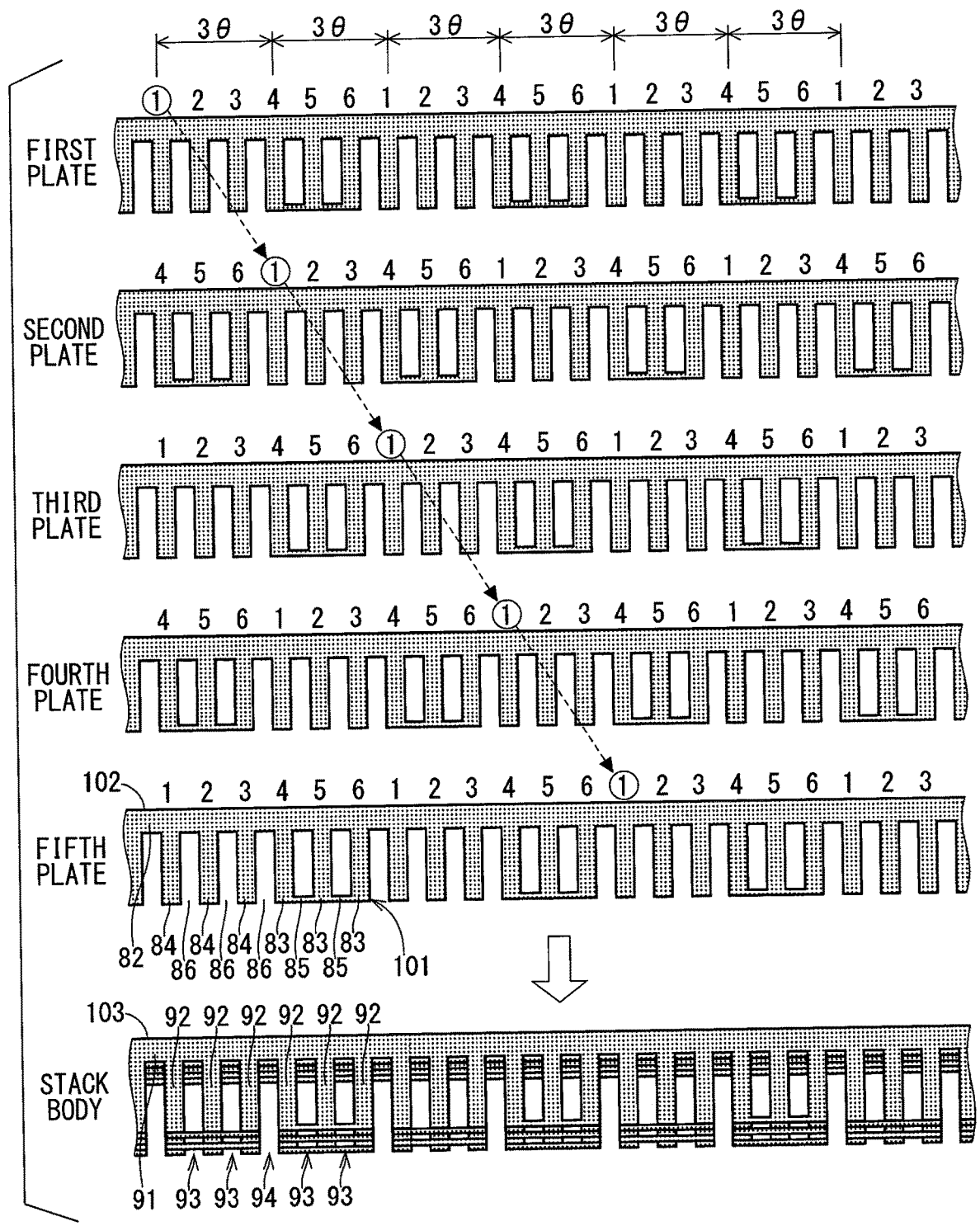
FIG. 13 is a schematic view of a stator core according to a second embodiment and showing a development of a plate of each layer and the stator core formed of a stack of such plates.

In a second embodiment, as shown in FIG. 13, a three-connected tooth part 101 is formed by combining three top-connected tooth parts 83, which are connected by the top magnetic path part 85. A plate 102 is formed such that three top-separated tooth parts 84 and one three-connected tooth part 101 are arranged alternately in the circumferential direction. A stator core 103 is formed by rotationally stacking the plural plates 102 of the same type with a fixed rotational buildup angle 3θ. The stator core 103 includes the partially-connected parts 93 and the open parts 94 similarly to the stator core 54 of the first embodiment. The second embodiment thus provides the advantages (A) to (F) described above.

Third Embodiment

Figure 14:
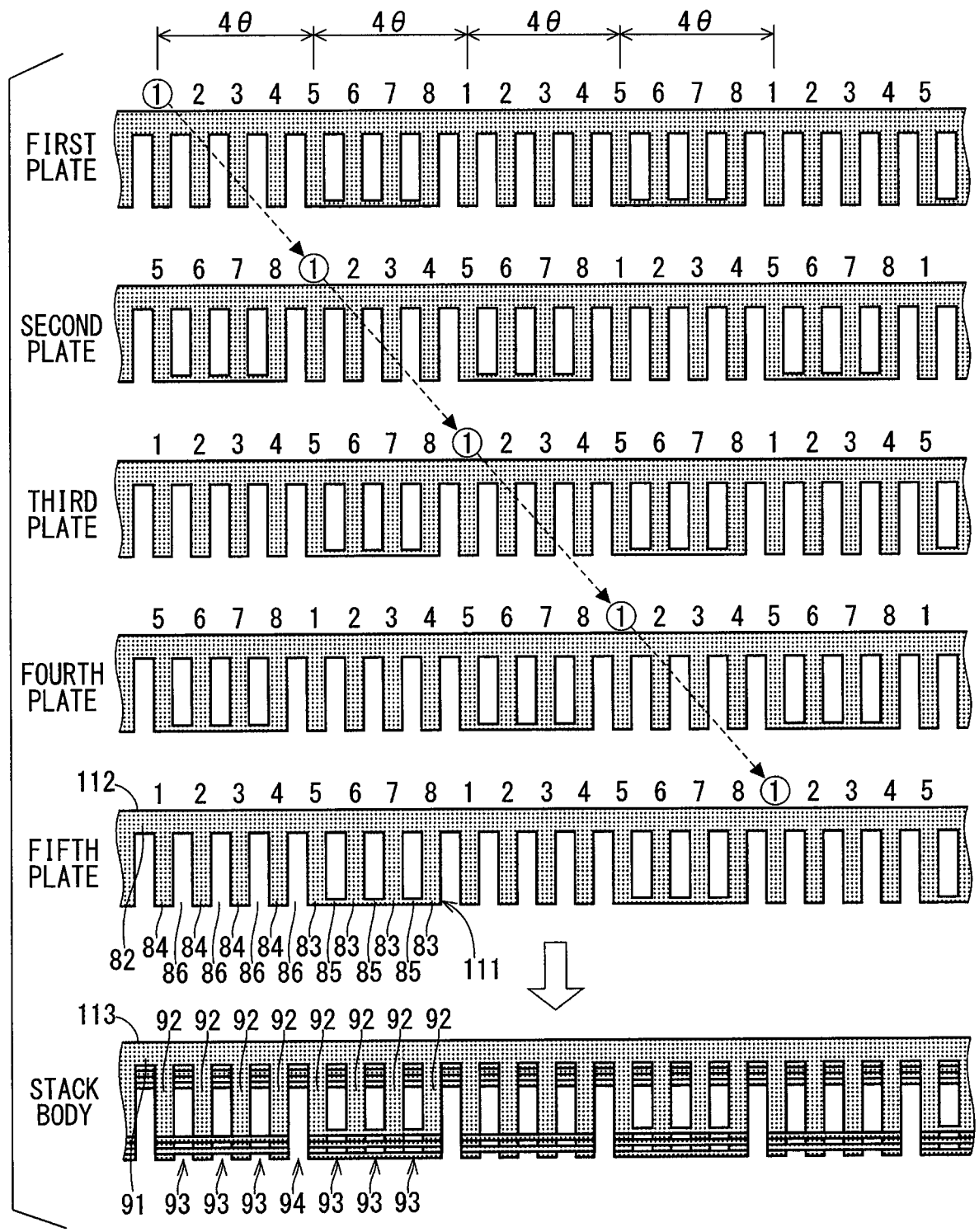
FIG. 14 is a schematic view of a stator core according to a third embodiment and showing a development of a plate of each layer and the stator core formed of a stack of such plates.

In a third embodiment, as shown in FIG. 14, a four-connected tooth part 111 is formed by combining four top-connected tooth parts 83, which are connected by the top magnetic path parts 85. A plate 112 is formed such that four top-separated tooth parts 84 and one four-connected tooth part 111 are arranged alternately in the circumferential direction. A stator core 113 is formed by rotationally stacking the plural plates 112 of the same type with a fixed rotational buildup angle 4θ. The stator core 113 includes the partially-connected parts 93 and the open parts 94 similarly to the stator core 54 of the first embodiment. The third embodiment thus provides the advantages (A) to (F) described above.

Fourth Embodiment

Figure 15:
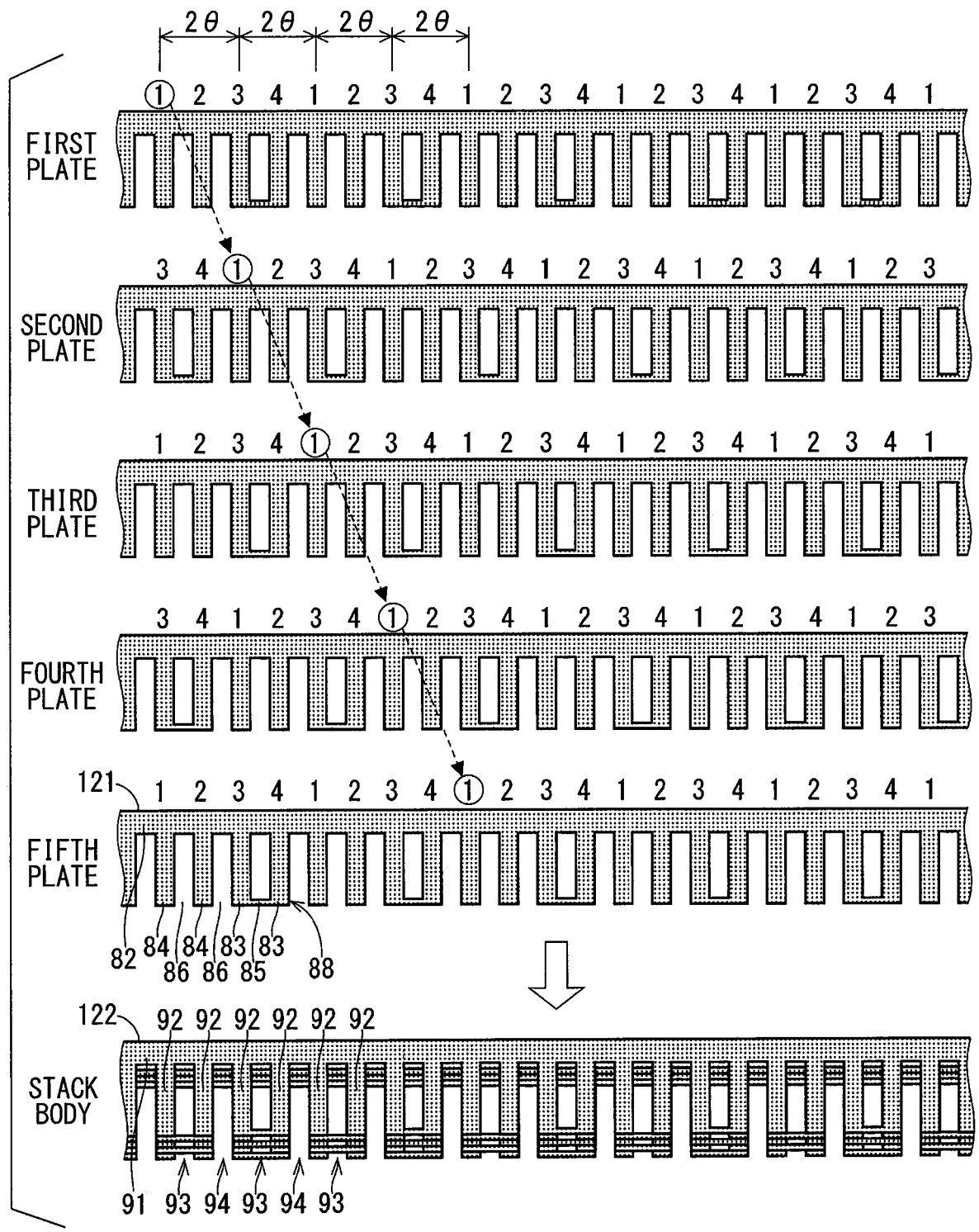
FIG. 15 is a schematic view of a stator core according to a fourth embodiment and showing a development of a plate of each layer and the stator core formed of a stack of such plates.

In a fourth embodiment, as shown in FIG. 15, a plate 121 is formed such that two top-separated tooth parts 84 and one two-connected tooth part 88 are arranged alternately in the circumferential direction. A stator core 122 is formed by rotationally stacking the plural plates 121 of the same type with a fixed rotational buildup angle 2θ. The stator core 122 includes the partially-connected parts 93 and the open parts 94 similarly to the stator core 54 of the first embodiment. The fourth embodiment thus provides the advantages (A) to (F) described above.

Fifth Embodiment

Figure 16:
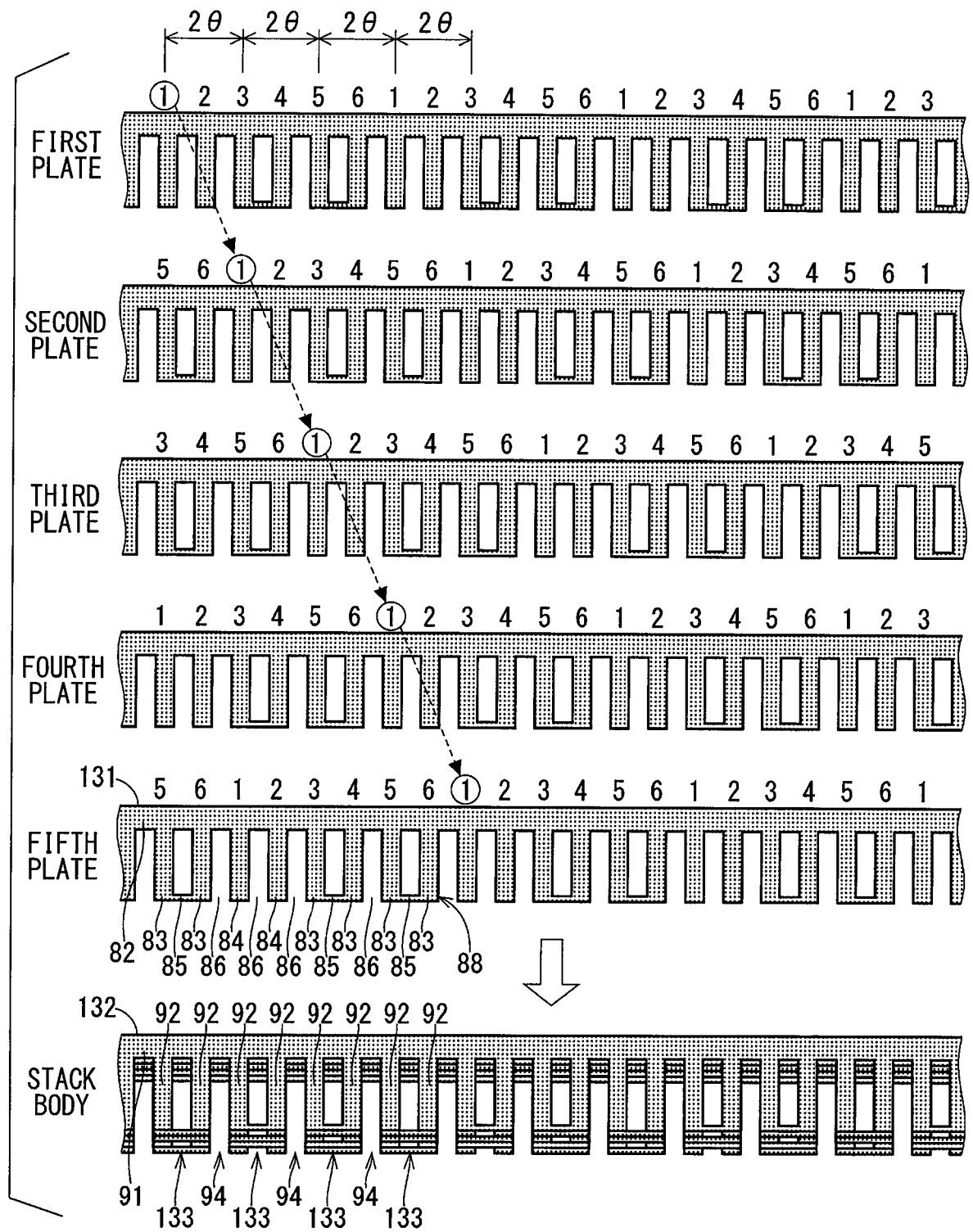
FIG. 16 is a schematic view of a stator core according to a fifth embodiment and showing a development of a plate of each layer and the stator core formed of a stack of such plates.

In a fifth embodiment, as shown in FIG. 16, a plate 131 is formed such that two top-separated tooth parts 84 and two two-connected tooth parts 88 are arranged alternately in the circumferential direction. A stator core 132 is formed by rotationally stacking the plural plates 131 of the same type with a fixed rotational buildup angle 2θ. The stator core 132 includes the open parts 94, which are similar to the stator core 54 of the first embodiment, and partially-connected parts 133, in which two top magnetic path parts 85 and one top open part 86 are provided alternately in the axial direction. The fifth embodiment thus provides the advantages (A) to (F) described above.

Sixth Embodiment

Figure 17:
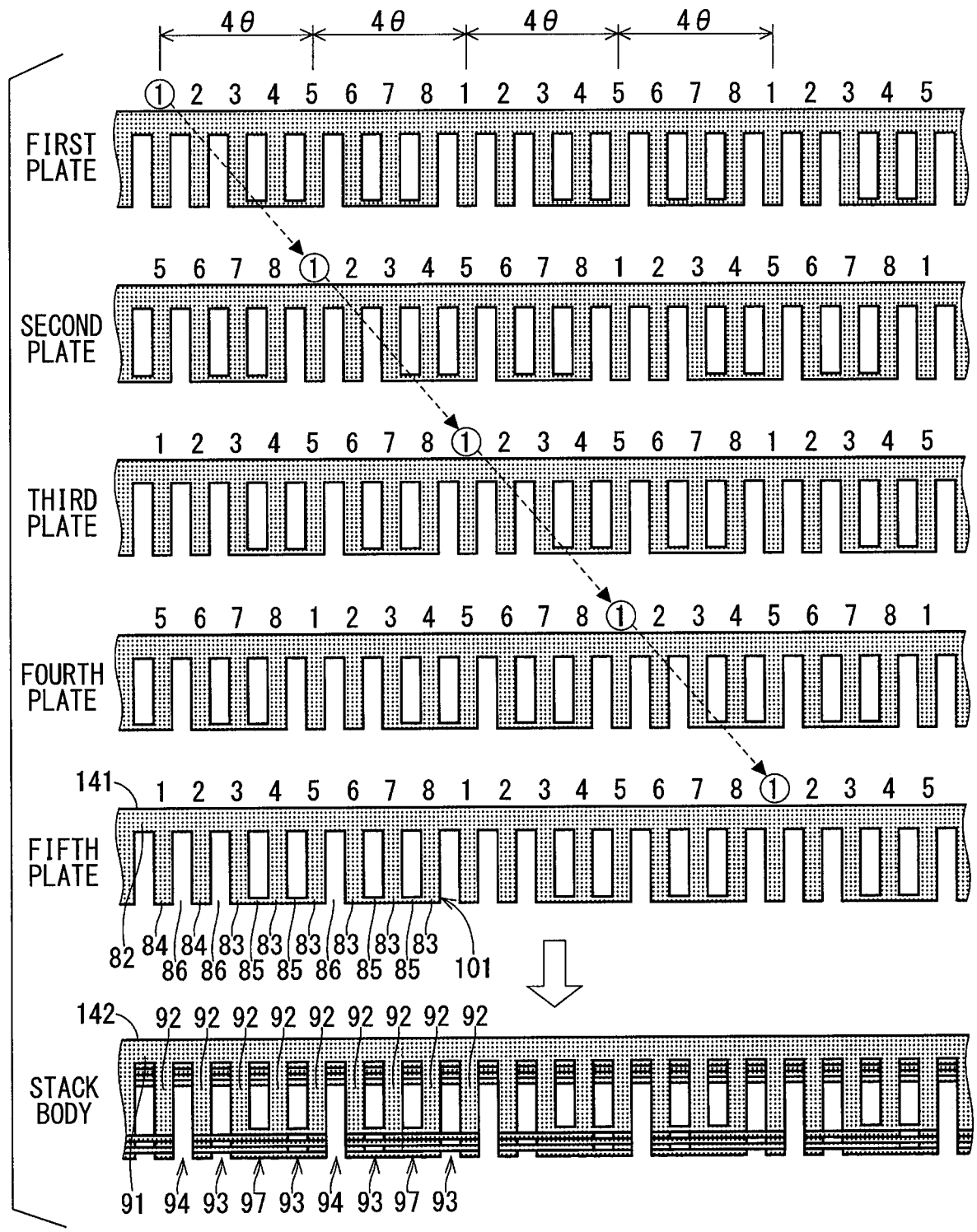
FIG. 17 is a schematic view of a stator core according to a sixth embodiment and showing a development of a plate of each layer and the stator core formed of a stack of such plates.

In a sixth embodiment, as shown in FIG. 17, a plate 141 is formed such that two top-separated tooth parts 84 and two three-connected tooth parts 101 are arranged alternately in the circumferential direction. A stator core 142 is formed by rotationally stacking the plural plates 141 of the same type with a fixed rotational buildup angle 4θ.

The stator core 142 includes the open parts 94, which are similar to the stator core 54 of the first embodiment. Further, the partially-connected parts 93 and the fully-connected parts 97 are arranged between the top ends of the teeth 92 located between two open parts 94 in the circumferential direction. The fully-connected part 97 is formed of only plural top magnetic path parts 85, which continues in the axial direction. The sixth embodiment thus provides the advantages (A) and (C) to (F) described above.

Further, in the sixth embodiment, the partially-connected part 93, the fully-connected part 97 and the partially-connected part 93 are arranged in this order between two open parts 94. Assuming that a rate of the open part in the axial direction is an open rate, the open rates between the top ends of the teeth 92 are 0%, 50%, 100%, 50% and 0%.

Seventh Embodiment

Figure 18:
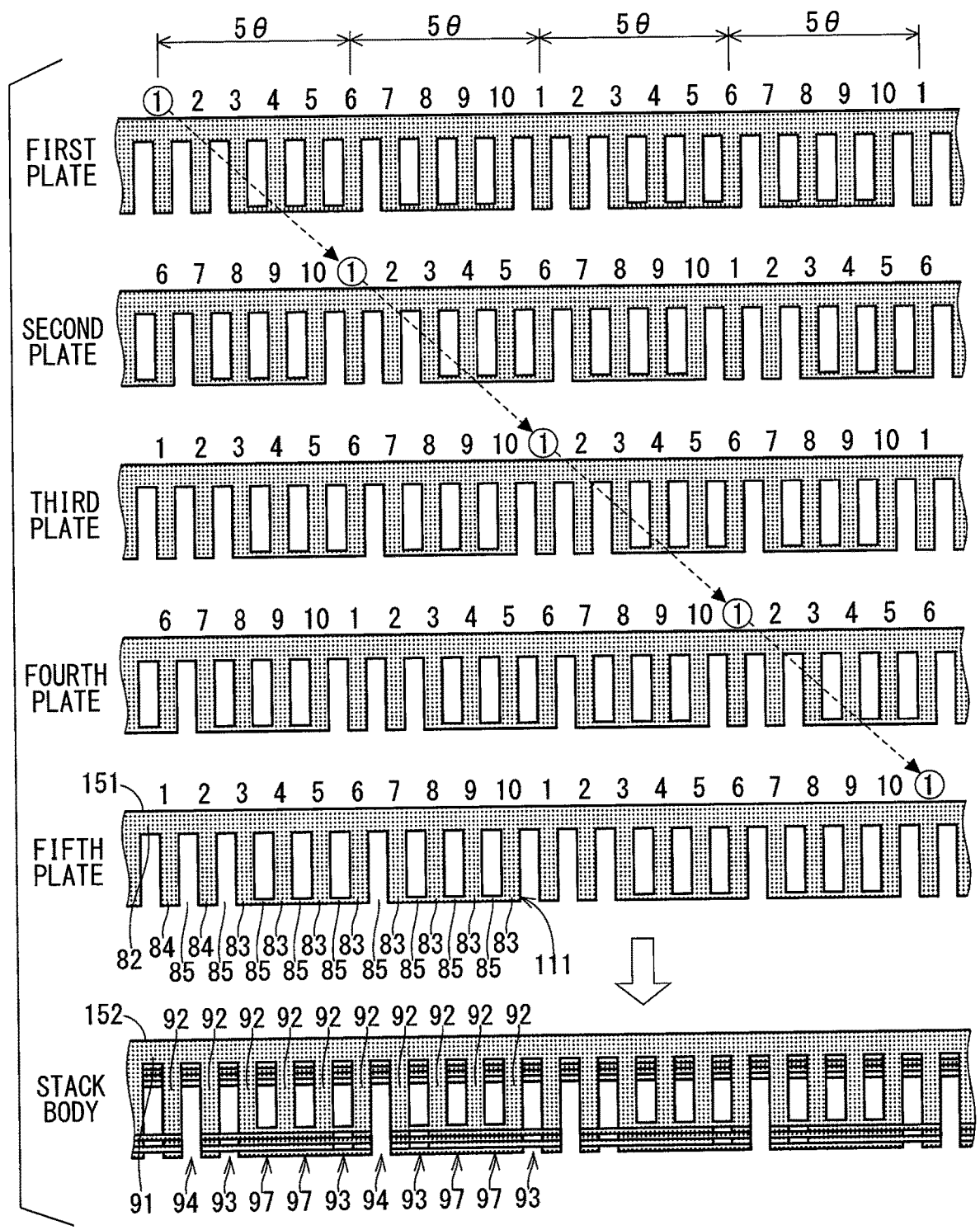
FIG. 18 is a schematic view of a stator core according to a seventh embodiment and showing a development of a plate of each layer and the stator core formed of a stack of such plates.

In a seventh embodiment, as shown in FIG. 18, a plate 151 is formed such that two top-separated tooth parts 84 and two four-connected tooth parts 111 are arranged alternately in the circumferential direction. A stator core 152 is formed by rotationally stacking the plural plates 151 of the same type with a fixed rotational buildup angle 5θ. The stator core 152 includes the open parts 94, which are similar to the stator core 142 of the sixth embodiment, the partially-connected parts 93 and the fully-connected parts 97. The seventh embodiment thus provides the advantages (A) and (C) to (F) described above.

Eighth Embodiment

Figure 19:
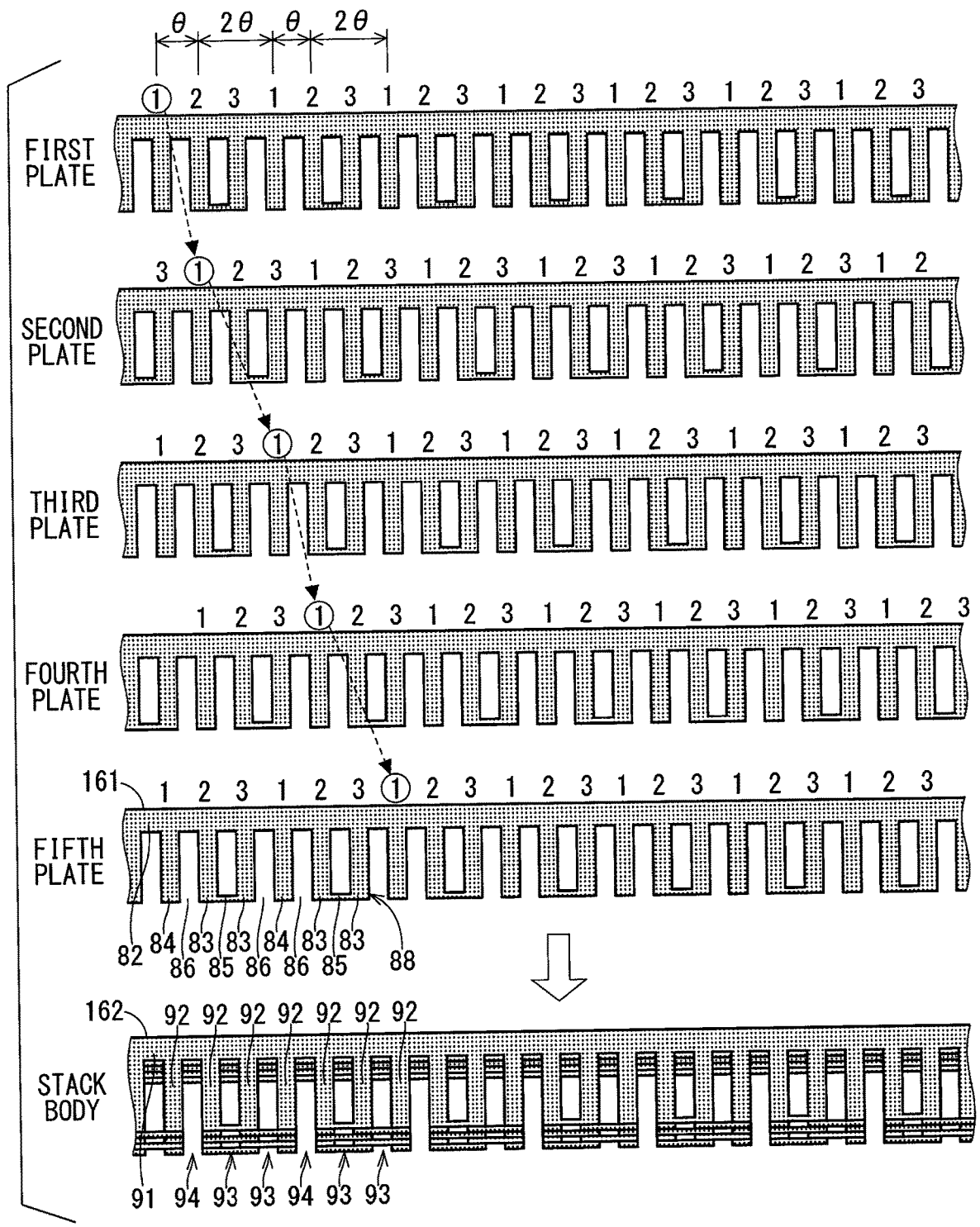
FIG. 19 is a schematic view of a stator core according to an eighth embodiment and showing a development of a plate of each layer and the stator core formed of a stack of such plates.

In an eighth embodiment, as shown in FIG. 19, a plate 161 is formed such that one top-separated tooth part 84 and one two-connected tooth part 111 are arranged alternately in the circumferential direction. A stator core 162 is formed by rotationally stacking the plural plates 161 of the same type. The rotational buildup angle of the stator core 162 is θ or 2θ, which are alternated. The stator core 162 includes the partially-connected parts 93, which are similar to the stator core 54 of the first embodiment, and the open parts 94. The eighth embodiment thus provides the advantages (A) to (D) and (F) described above.

Ninth Embodiment

Figure 20:
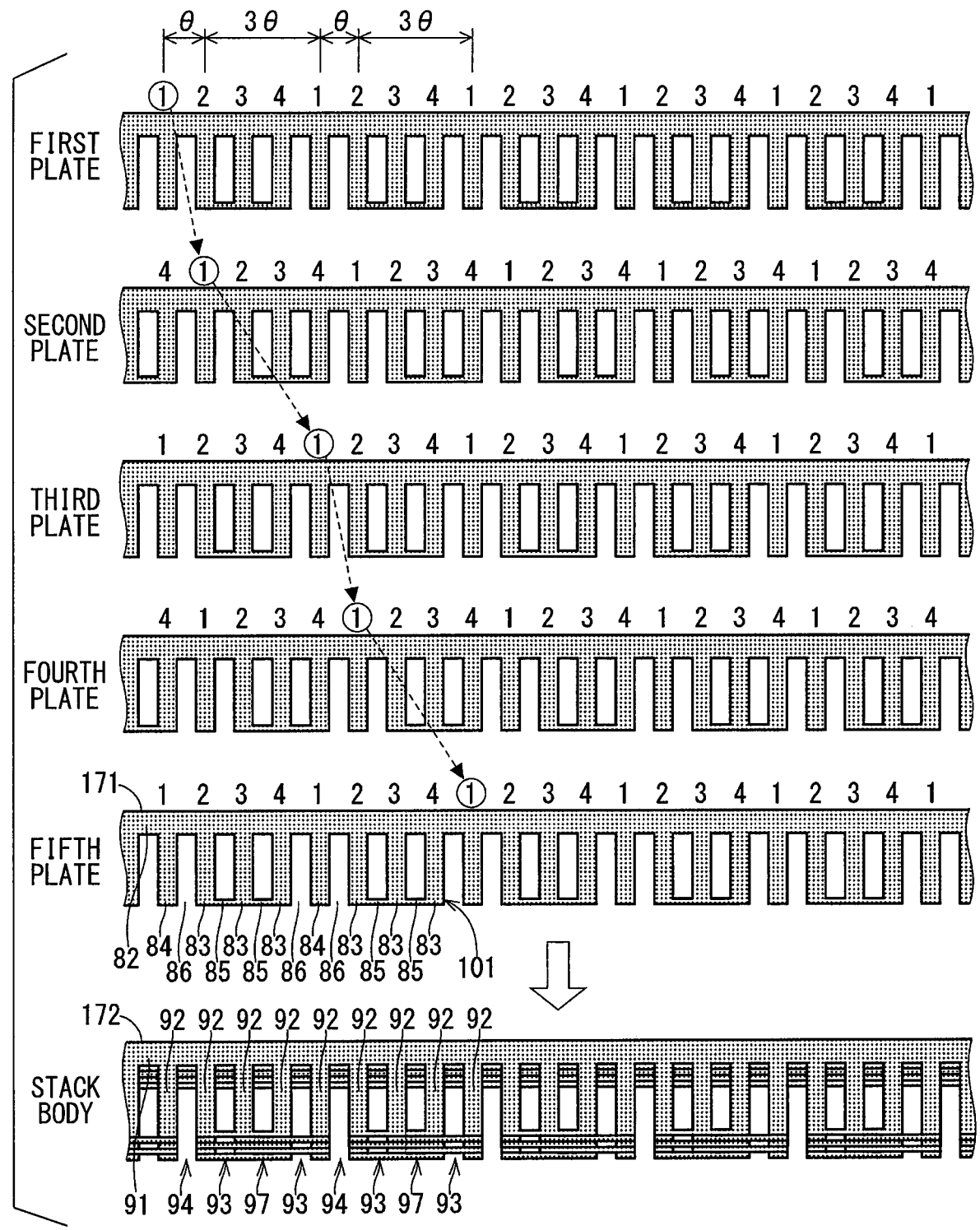
FIG. 20 is a schematic view of a stator core according to a ninth embodiment and showing a development of a plate of each layer and the stator core formed of a stack of such plates.

In a ninth embodiment, as shown in FIG. 20, a plate 171 is formed such that one top-separated tooth part 84 and one three-connected tooth part 101 are arranged alternately in the circumferential direction. A stator core 172 is formed by rotationally stacking the plural plates 171 of the same type. The rotational buildup angle of the stator core 172 is θ or 3θ, which are alternated. The stator core 172 includes the partially-connected parts 93, which are similar to the stator core 54 of the first embodiment, and the open parts 94. The ninth embodiment thus provides the advantages (A) to (D) and (F) described above.

Tenth Embodiment

Figure 21:
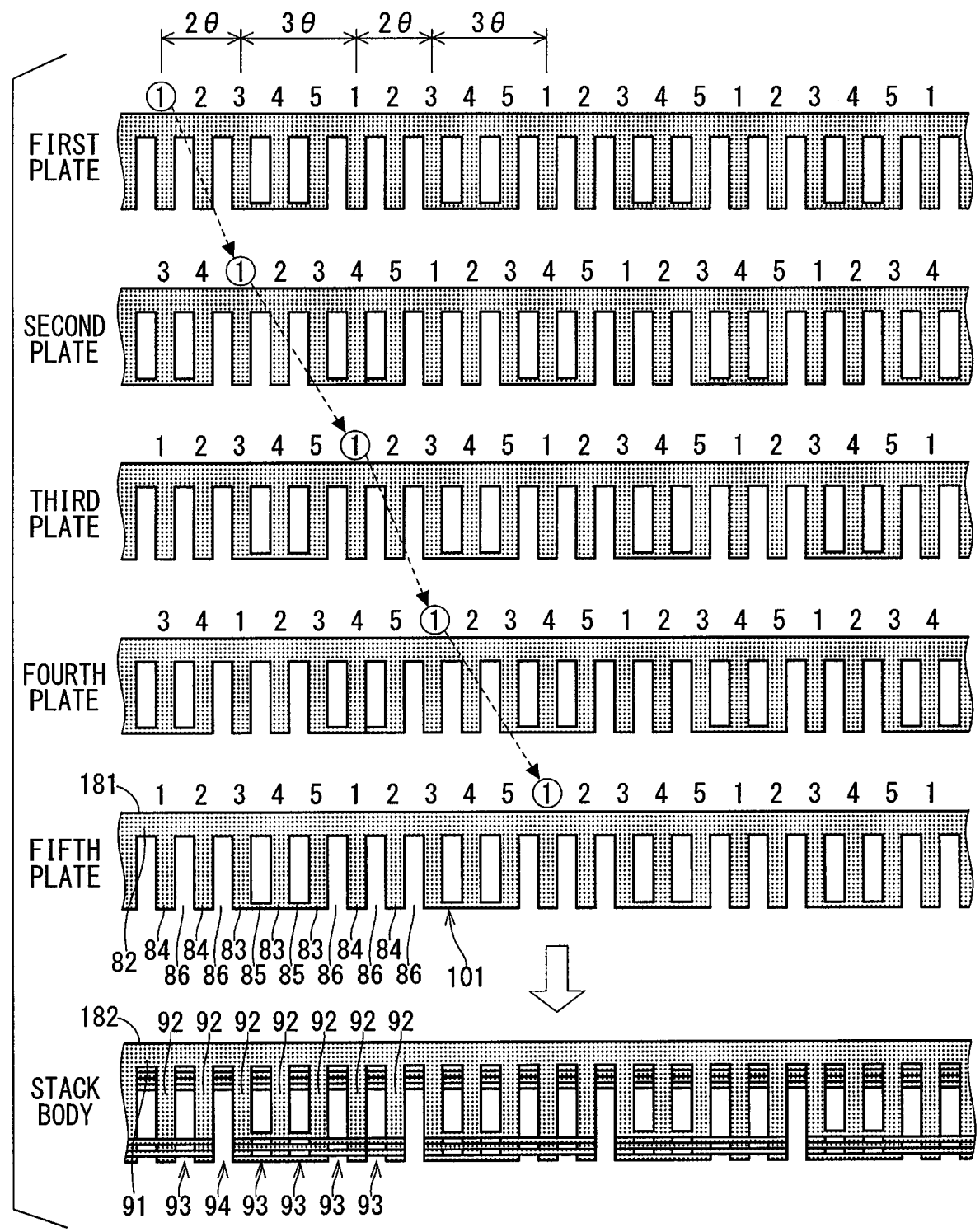
FIG. 21 is a schematic view of a stator core according to a tenth embodiment and showing a development of a plate of each layer and the stator core formed of a stack of such plates.

In a tenth embodiment, as shown in FIG. 21, a plate 181 is formed such that two top-separated tooth parts 84 and one three-connected tooth part 101 are arranged alternately in the circumferential direction. A stator core 182 is formed by rotationally stacking the plural plates 181 of the same type. The rotational buildup angle of the stator core 182 is 2θ or 3θ, which are alternated. The stator core 182 includes the partially-connected parts 93, which are similar to the stator core 54 of the first embodiment, and the open parts 94. The tenth embodiment thus provides the advantages (A) to (D) and (F) described above.

Eleventh Embodiment

Figure 22:
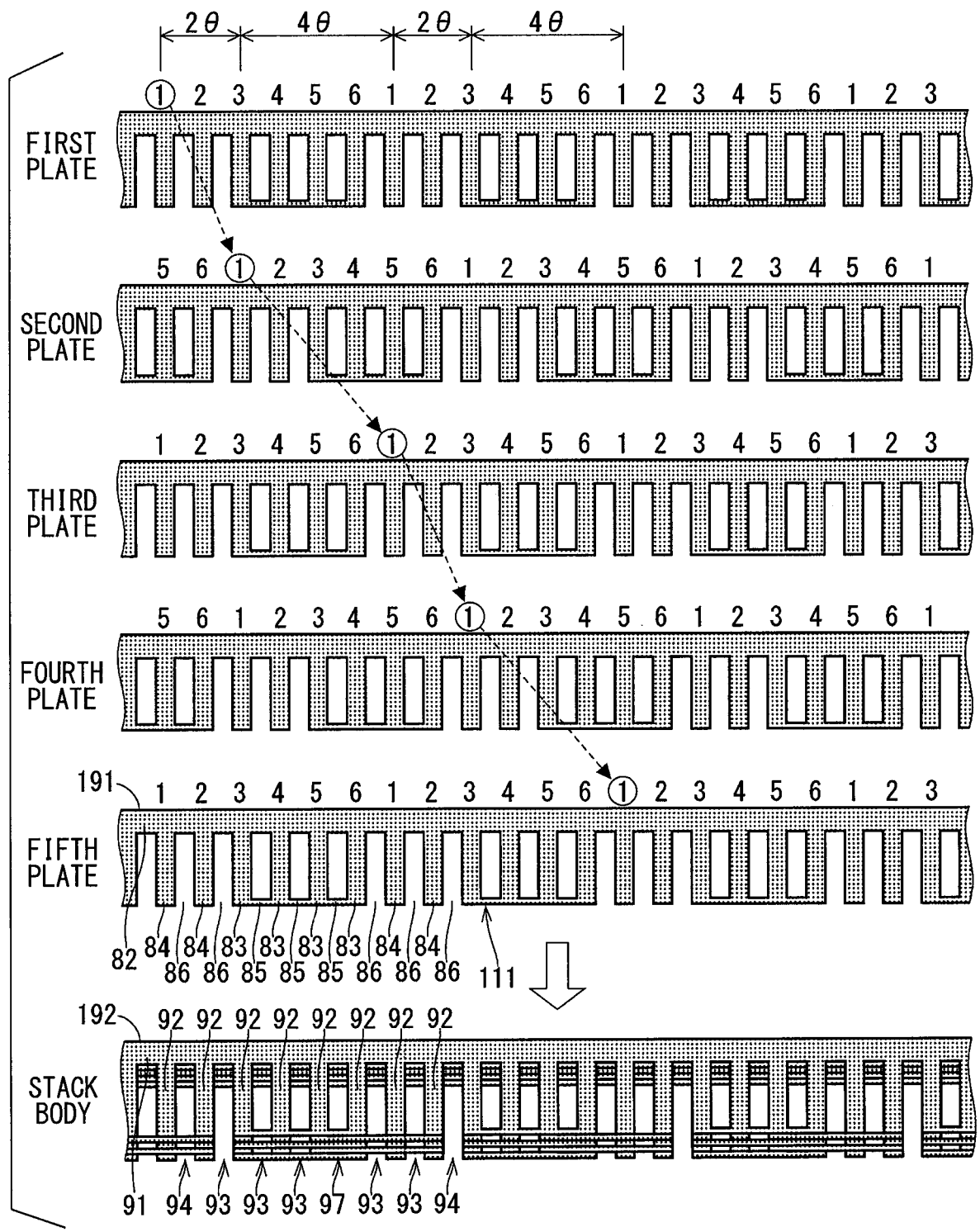
FIG. 22 is a schematic view of a stator core according to an eleventh embodiment and showing a development of a plate of each layer and the stator core formed of a stack of such plates.

In an eleventh embodiment, as shown in FIG. 22, a plate 191 is formed such that two top-separated tooth parts 84 and one four-connected tooth part 111 are arranged alternately in the circumferential direction. A stator core 192 is formed by rotationally stacking the plural plates 191 of the same type. The rotational buildup angle of the stator core 192 is 2θ or 4θ, which are alternated. The stator core 192 includes the partially-connected parts 93, which are similar to the stator core 54 of the first embodiment, and the open parts 94. The eleventh embodiment thus provides the advantages (A) to (D) and (F) described above.

Twelfth Embodiment

Figure 23:
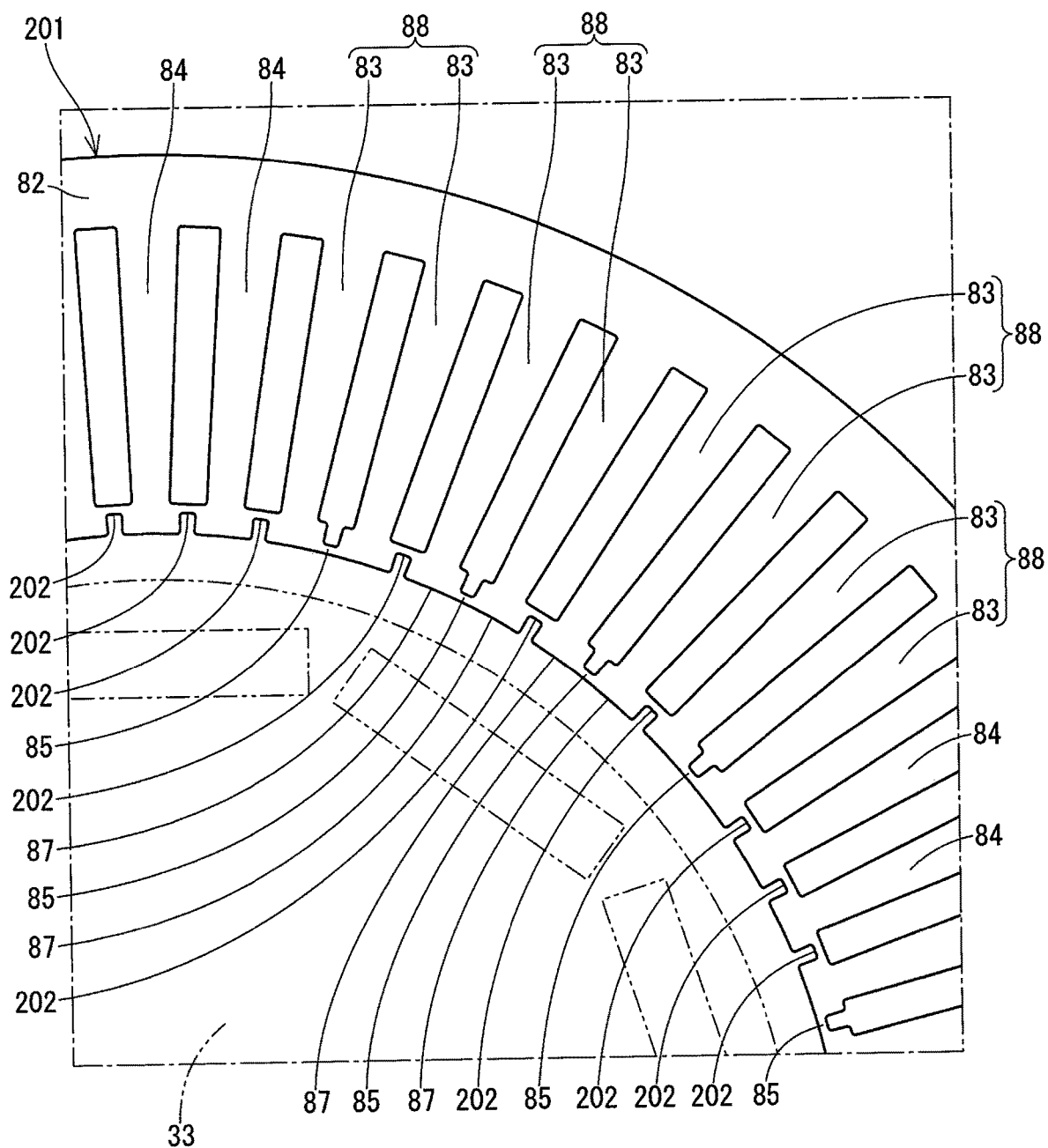
FIG. 23 is a partial enlarged view of a plate forming a stator core according to a twelfth embodiment.
Figure 24:
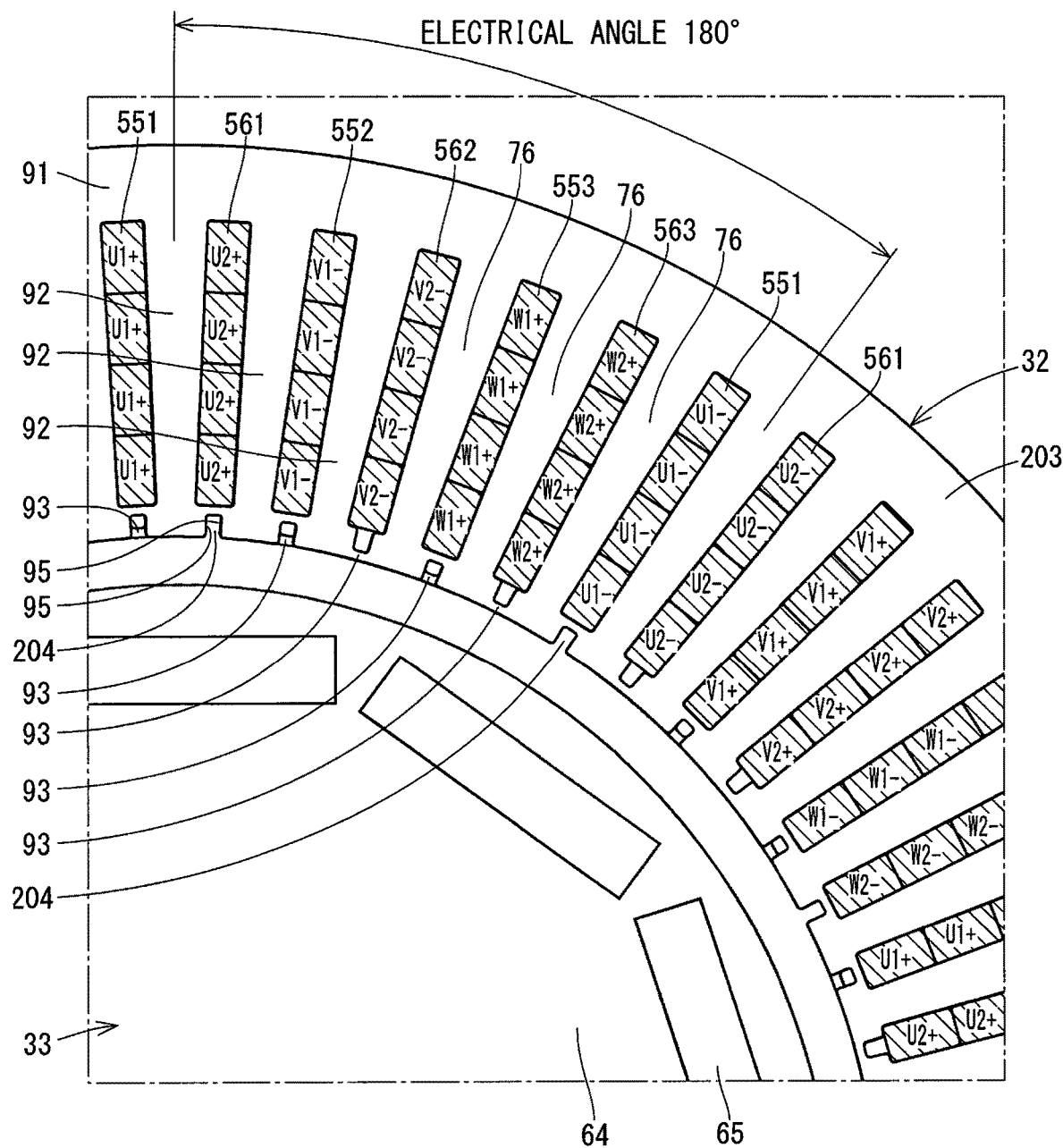
FIG. 24 is a partial enlarged view of the stator core according to the twelfth embodiment.

In a twelfth embodiment, as shown in FIG. 23, a top open part 202 of a plate 210 is formed of a recess, which is open toward the rotor 33 side at both sides of the top end of the top-separated tooth part 84. As shown in FIG. 24, an open part 204 of a stator core 203 is formed of only plural top open parts 202, which extends continuously in the axial direction, and opens toward the rotor 33 side. The open part 204 extends in the axial direction. The stator core 203 includes the partially-connected parts 93, which is similar to the stator core 54 of the first embodiment, and the open parts 204, which are open toward the rotor 33 side and extends continuously in the axial direction. The twelfth embodiment thus provides the advantages (A) to (E) described above. The open part 204 need not penetrate in the radial direction from the rotor 33 side to the slot 58. Even in this case, it is possible to support the tooth 92 by inserting the support member into the open part 204 from the inner side when the winding is formed in the stator core 203.

Thirteenth Embodiment

Figure 25:
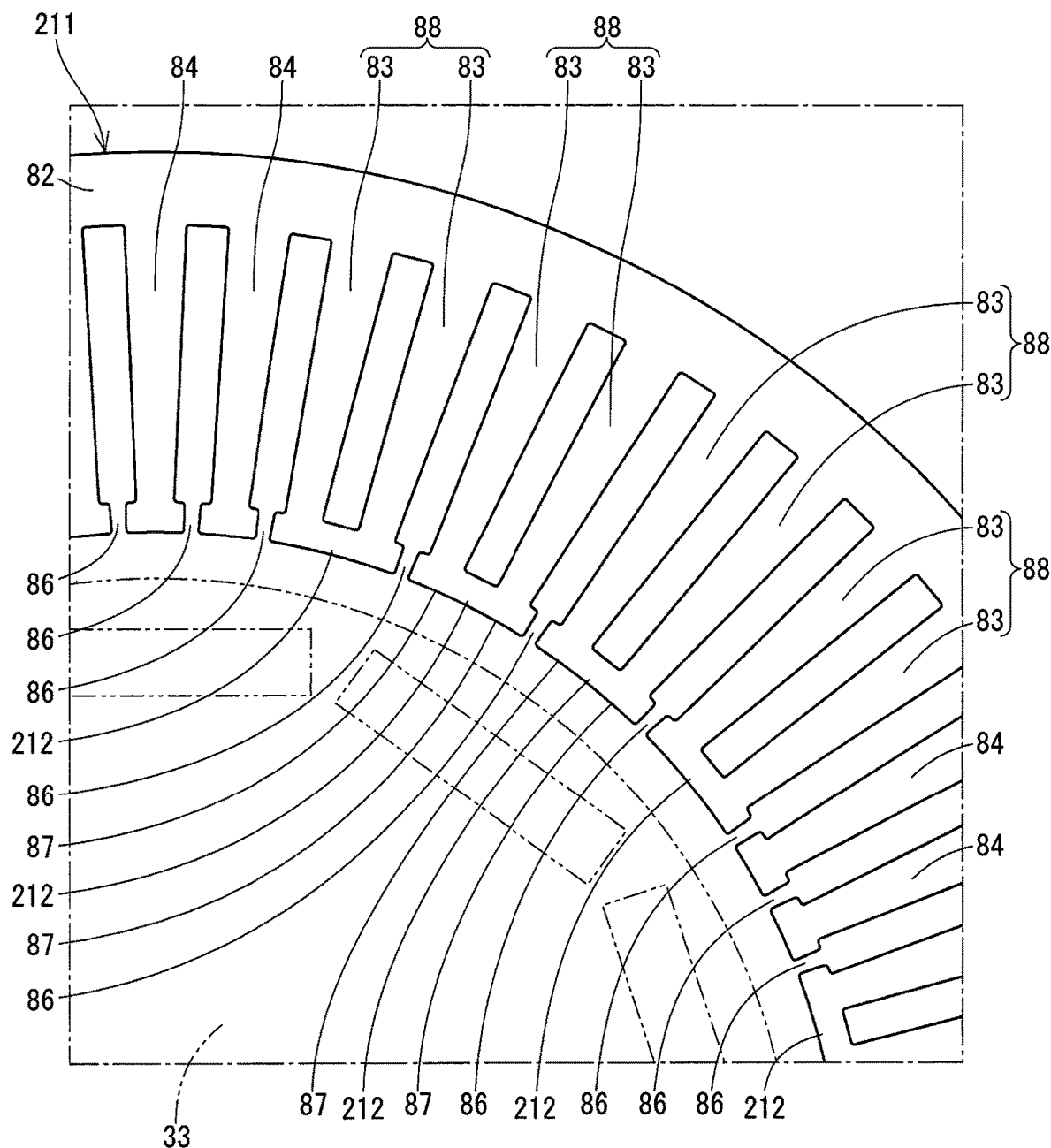
FIG. 25 is a partial enlarged view of a plate forming a stator core according to a thirteenth embodiment.
Figure 26:
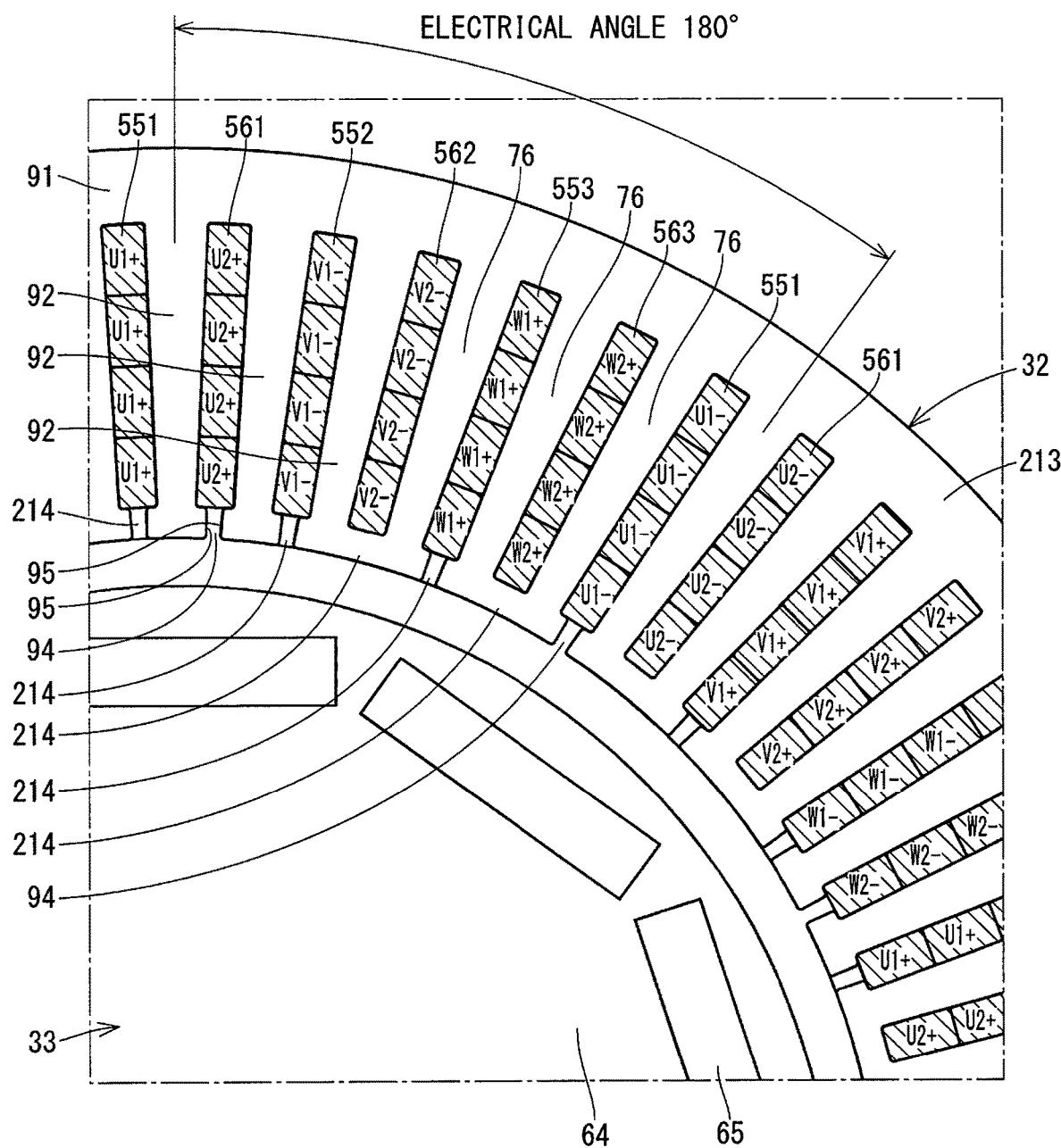
FIG. 26 is a partial enlarged view of the stator core according to the thirteenth embodiment.

In a thirteenth embodiment, as shown in FIG. 25, a top magnetic path part 212 of a plate 211 connects wholly top end parts of two top-connected tooth parts 83. The top magnetic path part 212 may be provided not only the top end part of the top-connected tooth part 83 but also the whole top end part. As shown in FIG. 26, a partially-connected part 214 of the stator core 213 is formed of the plural top magnetic path parts 212, which extend continuously in the axial direction, and the top open part 86. The stator core 213 includes the open parts 94, which are similar to the stator core 54 of the first embodiment, and the partially-connected parts 214, which connect the top ends of the top-connected tooth parts 83. The thirteenth embodiment thus provides the advantages (A) to (E) described above.

Other Embodiment

As other embodiments, the motor may be used in other motor-driven apparatuses other than the electric power steering apparatus. Further, the stator core may be used in power generators other than motors.

What is claimed is:

1. A stator core for a rotary electric machine having a rotor, the stator core comprising:
    plural plates, each of which includes:
    a back yoke part formed in an annular shape;
    plural top-connected tooth parts protruding from the back yoke part in a radial direction toward the rotor of the rotary electric machine;
    plural top-separated tooth parts protruding from the back yoke part in the radial direction toward the rotor;
    plural top magnetic path parts connecting top ends of two of the top-connected tooth parts; and
    plural top open parts opening toward the rotor at both sides of the top ends of the top-separated tooth parts,
    wherein the plural plates are stacked in an axial direction to form the stator core, which comprises:
    a back yoke formed of the plural back yoke parts and extending continuously in the axial direction;
    plural teeth formed of the plural top-connected tooth parts and the plural top-separated tooth parts and extending continuously in the axial direction;
    plural partially-connected parts formed of the plural top magnetic path parts and the plural top open parts and extending continuously in the axial direction; and
    plural open parts formed of only the plural top open parts and extending continuously over a whole length of the stator core in the axial direction while opening toward the rotor.

2. The stator core according to claim 1, wherein:
    the plural open parts are arranged equi-angularly in a circumferential direction of the rotary electric machine; and
    only the partially-connected part is arranged between top ends of the tooth, which is between two of the plural open parts in the circumferential direction.

3. The stator core according to claim 1, wherein:
    the partially-connected part is formed of the top magnetic path part and the top open part, which are arranged alternately in the axial direction.

4. The stator core according to claim 1, wherein:
    two of the top-connected tooth parts are connected to each other by the top magnetic path part to form a two-connected tooth part;

the plate is formed of two of the top-separated tooth parts and four two-connected tooth parts, which are arranged alternately in a circumferential direction of the rotary electric machine; and the stator core is a stack body, a rotational buildup angle of which is fixed to 5θ, with θ being an angular pitch of two of the teeth, which are adjacent to each other in the circumferential direction.

5. The stator core according to claim 1, wherein:
three of the top-connected tooth parts are connected to one another by the top magnetic path part to form a four-connected tooth part;
the plate is formed of three of the top-separated tooth parts and one three-connected tooth part, which are arranged alternately in a circumferential direction of the rotary electric machine; and
the stator core is a stack body, a rotational buildup angle of which is fixed to 3θ, with θ being an angular pitch of two of the teeth, which are adjacent to each other in the circumferential direction.

6. The stator core according to claim 1, wherein:
four of the top-connected tooth parts are connected to one another by the top magnetic path part to form a four-connected tooth part;
the plate is formed of four of the top-separated tooth parts and one four-connected tooth part, which are arranged alternately in a circumferential direction of the rotary electric machine; and
the stator core is a stack body, a rotational buildup angle of which is fixed to 4θ, with θ being an angular pitch of two of the teeth, which are adjacent to each other in the circumferential direction.

7. The stator core according to claim 1, wherein:
two of the top-connected tooth parts are connected to each other by the top magnetic path part to form a two-connected tooth part;
the plate is formed of two of the top-separated tooth parts and one two-connected tooth part, which are arranged alternately in a circumferential direction of the rotary electric machine; and
the stator core is a stack body, a rotational buildup angle of which is fixed to 2θ, with θ being an angular pitch of two of the teeth, which are adjacent to each other in the circumferential direction.

8. The stator core according to claim 1, wherein:
two of the top-connected tooth parts are connected to each other by the top magnetic path part to form a two-connected tooth part;
the plate is formed of two of the top-separated tooth parts and two two-connected tooth parts, which are arranged alternately in a circumferential direction of the rotary electric machine; and the stator core is a stack body, a rotational buildup angle of which is fixed to 2θ, with θ being an angular pitch of two of the teeth, which are adjacent to each other in the circumferential direction.

9. The stator core according to claim 1, further comprising:
a fully-connected part formed of only the plural top magnetic path parts, which extend continuously in the axial direction,
wherein the open parts are arranged equi-angularly in a circumferential direction of the rotary electric machine, and
the partially-connected part or the fully-connected part is arranged between top ends of the teeth, which are located between two of the open parts in the circumferential direction.

10. The stator core according to claim 1, wherein:
the partially-connected part, the fully-connected part and the partially-connected part are arranged sequentially between two of the open parts in a circumferential direction of the rotary electric machine.

11. The stator core according to claim 9, wherein:
the top magnetic path part and the top open part are arranged alternately in the axial direction to form the partially-connected part.

12. The stator core according to claim 9, wherein:
three of the top-connected tooth parts are connected by the top magnetic path parts to form a three-connected tooth part;
the plate is formed of two of the top-separated tooth parts and two three-connected tooth parts, which are arranged alternately in the circumferential direction; and
the stator core is a stack body, a rotational buildup angle of which is fixed to 4θ, with θ being an angular pitch of two of the teeth, which are adjacent to each other in the circumferential direction.

13. The stator core according to claim 9, wherein:
four of the top-connected tooth parts are connected by the top magnetic path parts to form a four-connected tooth part;
the plate is formed of two of the top-separated tooth parts and two four-connected tooth parts, which are arranged alternately in the circumferential direction; and
the stator core is a stack body, a rotational buildup angle of which is fixed to 5θ, with θ being an angular pitch of two of the teeth, which are adjacent to each other in the circumferential direction.

14. The stator core according to claim 1, wherein:
the top open part is formed of a slit, which is fully open in the radial direction.

* * * * *